US010742340B2

(12) United States Patent
Raichelgauz et al.

(10) Patent No.: US 10,742,340 B2
(45) Date of Patent: Aug. 11, 2020

(54) SYSTEM AND METHOD FOR IDENTIFYING THE CONTEXT OF MULTIMEDIA CONTENT ELEMENTS DISPLAYED IN A WEB-PAGE AND PROVIDING CONTEXTUAL FILTERS RESPECTIVE THERETO

(71) Applicant: CORTICA, LTD., Ramat Gan (IL)

(72) Inventors: Igal Raichelgauz, Ramat Gan (IL); Karina Odinaev, Ramat Gan (IL); Yehoshua Y. Zeevi, Haifa (IL)

(73) Assignee: CORTICA LTD., Tel Aviv (IL)

( * ) Notice: Subject to any disclaimer, the term of this patent is extended or adjusted under 35 U.S.C. 154(b) by 733 days.

(21) Appl. No.: 14/198,178

(22) Filed: Mar. 5, 2014

(65) Prior Publication Data
US 2014/0188786 A1 Jul. 3, 2014

Related U.S. Application Data

(63) Continuation-in-part of application No. 13/624,397, filed on Sep. 21, 2012, now Pat. No. 9,191,626, which
(Continued)

(30) Foreign Application Priority Data

| Oct. 26, 2005 | (IL) | 171577 |
| Jan. 29, 2006 | (IL) | 173409 |
| Aug. 21, 2007 | (IL) | 185414 |

(51) Int. Cl.
*H04H 60/56* (2008.01)
*H04H 60/37* (2008.01)
(Continued)

(52) U.S. Cl.
CPC .......... *H04H 60/56* (2013.01); *G06F 16/957* (2019.01); *G06Q 30/0251* (2013.01);
(Continued)

(58) Field of Classification Search
CPC ... H04H 60/56; G06F 16/957; G06Q 30/0251
See application file for complete search history.

(56) References Cited

U.S. PATENT DOCUMENTS

| 4,733,353 A | 3/1988 | Jaswa |
| 4,932,645 A | 6/1990 | Schorey et al. |
| (Continued) |

FOREIGN PATENT DOCUMENTS

| EP | 1085464 A3 | 1/2007 |
| WO | 02/31764 | 4/2002 |
| (Continued) |

OTHER PUBLICATIONS

M. Schneider et al., "A Robust Content Based Digital Signature for Image Authentication", Proc. ICIP 1996, Laussane, Switzerland, Oct. 1996.*
(Continued)

*Primary Examiner* — Daniel C Puentes
(74) *Attorney, Agent, or Firm* — Reches Patent

(57) ABSTRACT

A method and system for providing contextual filters respective of an identified context of a plurality of multimedia content elements are provided. The method comprises receiving the plurality of multimedia content elements; generating at least one signature for each of the plurality of multimedia content elements; determining a context of each of the plurality of multimedia content elements based on its respective at least one signature, wherein a context is determined as the correlation among a plurality of cluster of signatures; and providing at least one contextual filter respective of the context of each of the plurality of multimedia content elements.

24 Claims, 8 Drawing Sheets

Related U.S. Application Data is a continuation-in-part of application No. 13/344,400, filed on Jan. 5, 2012, now Pat. No. 8,959,037, which is a continuation of application No. 12/434,221, filed on May 1, 2009, now Pat. No. 8,112,376, said application No. 13/624,397 is a continuation-in-part of application No. 12/084,150, filed as application No. PCT/IL2006/001235 on Oct. 26, 2006, now Pat. No. 8,655,801, said application No. 13/624,397 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801.

(60) Provisional application No. 61/773,349, filed on Mar. 6, 2013.

(51) Int. Cl.

| | |
|---|---|
| *H04N 21/258* | (2011.01) |
| *H04N 21/2668* | (2011.01) |
| *H04N 21/466* | (2011.01) |
| *H04H 60/47* | (2008.01) |
| *H04H 60/33* | (2008.01) |
| *H04N 7/173* | (2011.01) |
| *H04N 21/81* | (2011.01) |
| *G06Q 30/02* | (2012.01) |
| *G06F 16/957* | (2019.01) |

(52) U.S. Cl.
CPC ............ *H04H 60/33* (2013.01); *H04H 60/37* (2013.01); *H04H 60/47* (2013.01); *H04N 7/17318* (2013.01); *H04N 21/25891* (2013.01); *H04N 21/2668* (2013.01); *H04N 21/466* (2013.01); *H04N 21/8106* (2013.01); *H04H 2201/90* (2013.01)

(56) References Cited

U.S. PATENT DOCUMENTS

| | | | |
|---|---|---|---|
| 4,972,363 A | 11/1990 | Nguyen et al. | |
| 5,214,746 A | 5/1993 | Fogel et al. | |
| 5,307,451 A | 4/1994 | Clark | |
| 5,412,564 A | 5/1995 | Ecer | |
| 5,436,653 A | 7/1995 | Ellis et al. | |
| 5,568,181 A | 10/1996 | Greenwood et al. | |
| 5,638,425 A | 6/1997 | Meador, III et al. | |
| 5,745,678 A * | 4/1998 | Herzberg | G06F 21/10 |
| | | | 705/51 |
| 5,763,069 A | 6/1998 | Jordan | |
| 5,806,061 A | 9/1998 | Chaudhuri et al. | |
| 5,852,435 A | 12/1998 | Vigneaux et al. | |
| 5,870,754 A | 2/1999 | Dimitrova et al. | |
| 5,873,080 A | 2/1999 | Coden et al. | |
| 5,887,193 A | 3/1999 | Takahashi et al. | |
| 5,978,754 A | 11/1999 | Kumano | |
| 5,991,306 A | 11/1999 | Burns et al. | |
| 6,052,481 A | 4/2000 | Grajski et al. | |
| 6,070,167 A | 5/2000 | Qian et al. | |
| 6,076,088 A | 6/2000 | Paik et al. | |
| 6,122,628 A | 9/2000 | Castelli et al. | |
| 6,128,651 A | 10/2000 | Cezar | |
| 6,137,911 A | 10/2000 | Zhilyaev | |
| 6,144,767 A | 11/2000 | Bottou et al. | |
| 6,147,636 A | 11/2000 | Gershenson | |
| 6,163,510 A | 12/2000 | Lee et al. | |
| 6,243,375 B1 | 6/2001 | Speicher | |
| 6,243,713 B1 | 6/2001 | Nelson et al. | |
| 6,275,599 B1 | 8/2001 | Adler et al. | |
| 6,329,986 B1 | 12/2001 | Cheng | |
| 6,381,656 B1 | 4/2002 | Shankman | |
| 6,411,229 B2 | 6/2002 | Kobayashi |
| 6,422,617 B1 | 7/2002 | Fukumoto et al. |
| 6,507,672 B1 | 1/2003 | Watkins et al. |
| 6,523,046 B2 | 2/2003 | Liu et al. |
| 6,524,861 B1 | 2/2003 | Anderson |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,640,015 B1 | 10/2003 | Lafruit |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,845,374 B1 | 1/2005 | Oliver et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,985,172 B1 | 1/2006 | Rigney et al. |
| 7,006,689 B2 | 2/2006 | Kasutani |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |
| 7,047,033 B2 | 5/2006 | Wyler |
| 7,158,681 B2 | 1/2007 | Persiantsev |
| 7,199,798 B1 | 4/2007 | Echigo et al. |
| 7,215,828 B2 | 5/2007 | Luo |
| 7,260,564 B1 | 8/2007 | Lynn et al. |
| 7,277,928 B2 | 10/2007 | Lennon |
| 7,299,261 B1 | 11/2007 | Oliver et al. |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,340,458 B2 | 3/2008 | Vaithilingam et al. |
| 7,353,224 B2 | 4/2008 | Chen et al. |
| 7,376,672 B2 | 5/2008 | Weare |
| 7,376,722 B1 | 5/2008 | Sim et al. |
| 7,433,895 B2 | 10/2008 | Li et al. |
| 7,464,086 B2 | 12/2008 | Black et al. |
| 7,526,607 B1 | 4/2009 | Singh et al. |
| 7,529,659 B2 | 5/2009 | Wold |
| 7,536,417 B2 | 5/2009 | Walsh et al. |
| 7,574,668 B2 | 8/2009 | Nunez et al. |
| 7,577,656 B2 | 8/2009 | Kawai et al. |
| 7,657,100 B2 | 2/2010 | Gokturk et al. |
| 7,660,468 B2 | 2/2010 | Gokturk et al. |
| 7,660,737 B1 | 2/2010 | Lim et al. |
| 7,694,318 B2 | 4/2010 | Eldering et al. |
| 7,697,791 B1 | 4/2010 | Chan et al. |
| 7,769,221 B1 | 8/2010 | Shakes et al. |
| 7,788,132 B2 | 8/2010 | Desikan et al. |
| 7,801,893 B2 | 9/2010 | Gulli |
| 7,836,054 B2 | 11/2010 | Kawai et al. |
| 7,837,111 B2 | 11/2010 | Yang et al. |
| 7,860,895 B1 | 12/2010 | Scofield |
| 7,904,503 B2 | 3/2011 | Van De Sluis |
| 7,920,894 B2 | 4/2011 | Wyler |
| 7,921,107 B2 | 4/2011 | Chang et al. |
| 7,933,407 B2 | 4/2011 | Keidar et al. |
| 7,974,881 B2 | 7/2011 | Culver et al. |
| 7,974,994 B2 | 7/2011 | Li et al. |
| 7,987,194 B1 | 7/2011 | Walker et al. |
| 7,987,217 B2 | 7/2011 | Long et al. |

(56) References Cited

U.S. PATENT DOCUMENTS

| | | | |
|---|---|---|---|
| 7,991,715 B2 | 8/2011 | Schiff et al. | |
| 8,000,655 B2 | 8/2011 | Wang et al. | |
| 8,023,739 B2 | 9/2011 | Hohimer et al. | |
| 8,036,893 B2 | 10/2011 | Reich | |
| 8,098,934 B2 | 1/2012 | Vincent | |
| 8,112,376 B2* | 2/2012 | Raichelgauz | H04H 20/103 706/46 |
| 8,266,185 B2 | 9/2012 | Raichelgauz et al. | |
| 8,275,764 B2 | 9/2012 | Jeon | |
| 8,312,031 B2 | 11/2012 | Raichelgauz et al. | |
| 8,315,442 B2 | 11/2012 | Gokturk et al. | |
| 8,316,005 B2 | 11/2012 | Moore | |
| 8,326,646 B2 | 12/2012 | Schwarzberg et al. | |
| 8,326,775 B2* | 12/2012 | Raichelgauz | G06F 17/30595 706/10 |
| 8,345,982 B2 | 1/2013 | Gokturk et al. | |
| 8,380,932 B1* | 2/2013 | Martin | G06F 17/30902 711/133 |
| RE44,225 E | 5/2013 | Aviv | |
| 8,457,827 B1 | 6/2013 | Ferguson et al. | |
| 8,495,489 B1 | 7/2013 | Everingham | |
| 8,527,978 B1 | 9/2013 | Sallam | |
| 8,548,828 B1 | 10/2013 | Longmire | |
| 8,634,980 B1 | 1/2014 | Urmson | |
| 8,635,531 B2 | 1/2014 | Graham et al. | |
| 8,655,801 B2* | 2/2014 | Raichelgauz | G06N 3/063 706/12 |
| 8,655,878 B1 | 2/2014 | Kulkarni et al. | |
| 8,677,377 B2 | 3/2014 | Cheyer et al. | |
| 8,682,667 B2 | 3/2014 | Haughay | |
| 8,688,446 B2 | 4/2014 | Yanagihara | |
| 8,706,503 B2 | 4/2014 | Cheyer et al. | |
| 8,775,442 B2 | 7/2014 | Moore et al. | |
| 8,781,152 B2 | 7/2014 | Momeyer | |
| 8,782,077 B1 | 7/2014 | Rowley | |
| 8,799,195 B2 | 8/2014 | Raichelgauz et al. | |
| 8,799,196 B2 | 8/2014 | Raichelquaz et al. | |
| 8,818,916 B2 | 8/2014 | Raichelgauz et al. | |
| 8,868,619 B2 | 10/2014 | Raichelgauz et al. | |
| 8,868,861 B2 | 10/2014 | Shimizu et al. | |
| 8,880,539 B2 | 11/2014 | Raichelgauz et al. | |
| 8,880,566 B2 | 11/2014 | Raichelgauz et al. | |
| 8,886,648 B1 | 11/2014 | Procopio et al. | |
| 8,898,568 B2 | 11/2014 | Bull et al. | |
| 8,922,414 B2 | 12/2014 | Raichelgauz et al. | |
| 8,959,037 B2* | 2/2015 | Raichelgauz | H04H 20/103 706/10 |
| 8,990,125 B2 | 3/2015 | Raichelgauz et al. | |
| 8,990,199 B1 | 3/2015 | Ramesh et al. | |
| 9,009,086 B2 | 4/2015 | Raichelgauz et al. | |
| 9,031,999 B2 | 5/2015 | Raichelgauz et al. | |
| 9,087,049 B2 | 7/2015 | Raichelgauz et al. | |
| 9,104,747 B2 | 8/2015 | Raichelgauz et al. | |
| 9,165,406 B1 | 10/2015 | Gray et al. | |
| 9,191,626 B2* | 11/2015 | Raichelgauz | H04H 20/103 |
| 9,197,244 B2 | 11/2015 | Raichelgauz et al. | |
| 9,218,606 B2 | 12/2015 | Raichelgauz et al. | |
| 9,235,557 B2 | 1/2016 | Raichelgauz et al. | |
| 9,256,668 B2 | 2/2016 | Raichelgauz et al. | |
| 9,298,763 B1 | 3/2016 | Zack | |
| 9,323,754 B2 | 4/2016 | Ramanathan et al. | |
| 9,330,189 B2 | 5/2016 | Raichelgauz et al. | |
| 9,384,196 B2 | 7/2016 | Raichelgauz et al. | |
| 9,438,270 B2 | 9/2016 | Raichelgauz et al. | |
| 9,440,647 B1 | 9/2016 | Sucan | |
| 9,466,068 B2 | 10/2016 | Raichelgauz et al. | |
| 9,606,992 B2 | 3/2017 | Geisner et al. | |
| 9,646,006 B2 | 5/2017 | Raichelgauz et al. | |
| 9,679,062 B2 | 6/2017 | Schillings et al. | |
| 9,734,533 B1 | 8/2017 | Givot | |
| 9,807,442 B2 | 10/2017 | Bhatia et al. | |
| 9,875,445 B2 | 1/2018 | Amer et al. | |
| 9,984,369 B2 | 5/2018 | Li et al. | |
| 10,133,947 B2 | 11/2018 | Yang | |
| 10,347,122 B2 | 7/2019 | Takenaka | |
| 10,491,885 B1 | 11/2019 | Hicks | |
| 2001/0019633 A1 | 9/2001 | Tenze | |
| 2001/0038876 A1 | 11/2001 | Anderson | |
| 2001/0056427 A1 | 12/2001 | Yoon et al. | |
| 2002/0010682 A1* | 1/2002 | Johnson | G06F 17/30864 705/59 |
| 2002/0010715 A1 | 1/2002 | Chinn et al. | |
| 2002/0019881 A1 | 2/2002 | Bokhari et al. | |
| 2002/0019882 A1 | 2/2002 | Bokhani | |
| 2002/0032677 A1 | 3/2002 | Morgenthaler et al. | |
| 2002/0037010 A1 | 3/2002 | Yamauchi | |
| 2002/0038299 A1 | 3/2002 | Zernik et al. | |
| 2002/0042914 A1 | 4/2002 | Walker et al. | |
| 2002/0059580 A1 | 5/2002 | Kalker et al. | |
| 2002/0072935 A1 | 6/2002 | Rowse et al. | |
| 2002/0087530 A1 | 7/2002 | Smith et al. | |
| 2002/0099870 A1* | 7/2002 | Miller | G11B 27/034 719/328 |
| 2002/0107827 A1 | 8/2002 | Benitez-Jimenez et al. | |
| 2002/0113812 A1 | 8/2002 | Walker et al. | |
| 2002/0123928 A1 | 9/2002 | Eldering et al. | |
| 2002/0126872 A1 | 9/2002 | Brunk et al. | |
| 2002/0129140 A1 | 9/2002 | Peled et al. | |
| 2002/0129296 A1 | 9/2002 | Kwiat et al. | |
| 2002/0143976 A1 | 10/2002 | Barker et al. | |
| 2002/0147637 A1 | 10/2002 | Kraft et al. | |
| 2002/0152267 A1 | 10/2002 | Lennon | |
| 2002/0157116 A1 | 10/2002 | Jasinschi | |
| 2002/0159640 A1 | 10/2002 | Vaithilingam et al. | |
| 2002/0161739 A1* | 10/2002 | Oh | G06Q 30/02 |
| 2002/0163532 A1 | 11/2002 | Thomas | |
| 2002/0174095 A1 | 11/2002 | Lulich et al. | |
| 2002/0178410 A1 | 11/2002 | Haitsma et al. | |
| 2002/0184505 A1 | 12/2002 | Mihcak et al. | |
| 2003/0005432 A1 | 1/2003 | Ellis et al. | |
| 2003/0028660 A1 | 2/2003 | Igawa et al. | |
| 2003/0037010 A1 | 2/2003 | Schmelzer | |
| 2003/0041047 A1 | 2/2003 | Chang et al. | |
| 2003/0050815 A1* | 3/2003 | Seigel | G06F 17/3087 705/26.41 |
| 2003/0078766 A1 | 4/2003 | Appelt et al. | |
| 2003/0086627 A1 | 5/2003 | Berriss et al. | |
| 2003/0089216 A1 | 5/2003 | Birmingham et al. | |
| 2003/0093790 A1 | 5/2003 | Logan et al. | |
| 2003/0101150 A1 | 5/2003 | Agnihotri | |
| 2003/0105739 A1* | 6/2003 | Essafi | G06F 21/64 |
| 2003/0115191 A1 | 6/2003 | Copperman et al. | |
| 2003/0126147 A1 | 7/2003 | Essafi et al. | |
| 2003/0182567 A1* | 9/2003 | Barton | H04H 60/27 713/193 |
| 2003/0184598 A1 | 10/2003 | Graham | |
| 2003/0191764 A1 | 10/2003 | Richards | |
| 2003/0200217 A1 | 10/2003 | Ackerman | |
| 2003/0217335 A1 | 11/2003 | Chung et al. | |
| 2003/0229531 A1 | 12/2003 | Heckerman et al. | |
| 2004/0003394 A1 | 1/2004 | Ramaswamy | |
| 2004/0025180 A1 | 2/2004 | Begeja et al. | |
| 2004/0059736 A1 | 3/2004 | Willse | |
| 2004/0068510 A1 | 4/2004 | Hayes et al. | |
| 2004/0091111 A1 | 5/2004 | Levy | |
| 2004/0095376 A1 | 5/2004 | Graham et al. | |
| 2004/0098671 A1 | 5/2004 | Graham et al. | |
| 2004/0107181 A1 | 6/2004 | Rodden | |
| 2004/0111432 A1 | 6/2004 | Adams et al. | |
| 2004/0111465 A1 | 6/2004 | Chuang et al. | |
| 2004/0117367 A1 | 6/2004 | Smith et al. | |
| 2004/0117638 A1 | 6/2004 | Monroe | |
| 2004/0128142 A1 | 7/2004 | Whitham | |
| 2004/0128511 A1* | 7/2004 | Sun | H04L 9/3247 713/176 |
| 2004/0133927 A1 | 7/2004 | Sternberg et al. | |
| 2004/0153426 A1 | 8/2004 | Nugent | |
| 2004/0215663 A1 | 10/2004 | Liu et al. | |
| 2004/0230572 A1 | 11/2004 | Omoigui | |
| 2004/0249779 A1 | 12/2004 | Nauck et al. | |
| 2004/0260688 A1 | 12/2004 | Gross | |
| 2004/0267774 A1 | 12/2004 | Lin et al. | |
| 2005/0021394 A1 | 1/2005 | Miedema et al. | |

(56) References Cited

U.S. PATENT DOCUMENTS

| | | |
|---|---|---|
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0163375 A1 | 7/2005 | Grady |
| 2005/0172130 A1* | 8/2005 | Roberts ............... G06F 21/64 713/176 |
| 2005/0177372 A1 | 8/2005 | Wang et al. |
| 2005/0193015 A1 | 9/2005 | Logston |
| 2005/0238198 A1 | 10/2005 | Brown et al. |
| 2005/0238238 A1* | 10/2005 | Xu ..................... G06F 16/7834 382/224 |
| 2005/0245241 A1* | 11/2005 | Durand ................. G06Q 30/02 455/414.1 |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0033163 A1 | 2/2006 | Chen |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0100987 A1 | 5/2006 | Leurs |
| 2006/0112035 A1 | 5/2006 | Cecchi et al. |
| 2006/0120626 A1 | 6/2006 | Perlmutter |
| 2006/0129822 A1* | 6/2006 | Snijder ................. H04H 60/56 713/176 |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0242139 A1 | 10/2006 | Butterfield et al. |
| 2006/0242554 A1 | 10/2006 | Gerace et al. |
| 2006/0247983 A1* | 11/2006 | Dalli ..................... G06F 17/27 705/26.1 |
| 2006/0248558 A1* | 11/2006 | Barton .................. H04H 60/27 725/46 |
| 2006/0251339 A1 | 11/2006 | Gokturk |
| 2006/0253423 A1 | 11/2006 | McLane et al. |
| 2006/0288002 A1 | 12/2006 | Epstein et al. |
| 2007/0019864 A1 | 1/2007 | Koyama et al. |
| 2007/0022374 A1 | 1/2007 | Huang et al. |
| 2007/0033163 A1 | 2/2007 | Epstein et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1* | 3/2007 | Fang .................... G06F 21/565 714/100 |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0124796 A1* | 5/2007 | Wittkotter .......... H04N 7/17309 725/136 |
| 2007/0130159 A1 | 6/2007 | Gulli et al. |
| 2007/0156720 A1 | 7/2007 | Maren |
| 2007/0168413 A1 | 7/2007 | Barletta et al. |
| 2007/0179359 A1 | 8/2007 | Goodwin |
| 2007/0195987 A1 | 8/2007 | Rhoads |
| 2007/0196013 A1 | 8/2007 | Li |
| 2007/0220573 A1 | 9/2007 | Chiussi et al. |
| 2007/0233701 A1* | 10/2007 | Sherwood .......... G06F 17/30029 |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0294295 A1 | 12/2007 | Finkelstein et al. |
| 2007/0298152 A1 | 12/2007 | Baets |
| 2008/0040277 A1 | 2/2008 | Dewitt |
| 2008/0046406 A1 | 2/2008 | Seide et al. |
| 2008/0049629 A1 | 2/2008 | Morrill |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0091527 A1 | 4/2008 | Silverbrook et al. |
| 2008/0109433 A1 | 5/2008 | Rose |
| 2008/0152231 A1 | 6/2008 | Gokturk |
| 2008/0159622 A1 | 7/2008 | Agnihotri et al. |
| 2008/0163288 A1 | 7/2008 | Ghosal et al. |
| 2008/0165861 A1 | 7/2008 | Wen |
| 2008/0166020 A1 | 7/2008 | Kosaka |
| 2008/0168135 A1* | 7/2008 | Redlich ................. G06Q 10/10 709/204 |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson |
| 2008/0307454 A1 | 12/2008 | Ahanger et al. |
| 2008/0313127 A1* | 12/2008 | Wong ................. G06F 17/30035 706/61 |
| 2008/0313140 A1 | 12/2008 | Pereira et al. |
| 2009/0013414 A1 | 1/2009 | Washington et al. |
| 2009/0022472 A1* | 1/2009 | Bronstein .......... G06K 9/00751 386/278 |
| 2009/0024641 A1 | 1/2009 | Quigley et al. |
| 2009/0034791 A1 | 2/2009 | Doretto |
| 2009/0043637 A1 | 2/2009 | Eder |
| 2009/0043818 A1* | 2/2009 | Raichelgauz ..... G06F 17/30595 |
| 2009/0080759 A1 | 3/2009 | Bhaskar |
| 2009/0089587 A1 | 4/2009 | Brunk et al. |
| 2009/0119157 A1 | 5/2009 | Dulepet |
| 2009/0125529 A1 | 5/2009 | Vydiswaran et al. |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0165031 A1* | 6/2009 | Li ............................ G06F 21/10 725/22 |
| 2009/0172030 A1 | 7/2009 | Schiff et al. |
| 2009/0175538 A1 | 7/2009 | Bronstein et al. |
| 2009/0204511 A1 | 8/2009 | Tsang |
| 2009/0208106 A1 | 8/2009 | Dunlop et al. |
| 2009/0216639 A1 | 8/2009 | Kapczynski et al. |
| 2009/0216761 A1* | 8/2009 | Raichelgauz ........ H04H 20/103 |
| 2009/0220138 A1 | 9/2009 | Zhang et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0254572 A1* | 10/2009 | Redlich ................. G06Q 10/06 |
| 2009/0259687 A1 | 10/2009 | Mai et al. |
| 2009/0277322 A1 | 11/2009 | Cai et al. |
| 2009/0278934 A1 | 11/2009 | Ecker |
| 2009/0282218 A1 | 11/2009 | Raichelgauz et al. |
| 2009/0297048 A1 | 12/2009 | Slotine et al. |
| 2009/0313305 A1* | 12/2009 | Raichelgauz ..... G06F 17/30017 |
| 2010/0010968 A1* | 1/2010 | Redlich ............. G06F 17/30672 707/E17.014 |
| 2010/0023400 A1 | 1/2010 | Dewitt |
| 2010/0042646 A1 | 2/2010 | Raichelgauz |
| 2010/0082684 A1* | 4/2010 | Churchill .......... G06F 17/30867 707/784 |
| 2010/0088321 A1 | 4/2010 | Soloman et al. |

(56) References Cited

U.S. PATENT DOCUMENTS

| | | |
|---|---|---|
| 2010/0104184 A1 | 4/2010 | Bronstein |
| 2010/0106857 A1 | 4/2010 | Wyler |
| 2010/0111408 A1 | 5/2010 | Matsuhira |
| 2010/0125569 A1 | 5/2010 | Nair |
| 2010/0153201 A1 | 6/2010 | De Rubertis et al. |
| 2010/0153209 A1 | 6/2010 | De Rubertis et al. |
| 2010/0162405 A1 | 6/2010 | Cook |
| 2010/0173269 A1 | 7/2010 | Puri et al. |
| 2010/0191567 A1 | 7/2010 | Lee et al. |
| 2010/0198626 A1 | 8/2010 | Cho et al. |
| 2010/0250497 A1* | 9/2010 | Redlich .................. F41H 13/00 707/661 |
| 2010/0268524 A1 | 10/2010 | Nath et al. |
| 2010/0284604 A1 | 11/2010 | Chrysanthakopoulos |
| 2010/0306193 A1 | 12/2010 | Pereira |
| 2010/0312736 A1 | 12/2010 | Kello |
| 2010/0317420 A1* | 12/2010 | Hoffberg ............. G06Q 30/0207 463/1 |
| 2010/0318493 A1 | 12/2010 | Wessling |
| 2010/0322522 A1 | 12/2010 | Wang et al. |
| 2010/0325138 A1* | 12/2010 | Lee .................. G06F 17/30873 707/759 |
| 2010/0325581 A1 | 12/2010 | Finkelstein et al. |
| 2011/0029620 A1 | 2/2011 | Bonforte |
| 2011/0035289 A1 | 2/2011 | King et al. |
| 2011/0038545 A1 | 2/2011 | Bober |
| 2011/0052063 A1 | 3/2011 | McAuley et al. |
| 2011/0055585 A1 | 3/2011 | Lee |
| 2011/0106782 A1 | 5/2011 | Ke et al. |
| 2011/0145068 A1 | 6/2011 | King et al. |
| 2011/0164180 A1 | 7/2011 | Lee |
| 2011/0164810 A1 | 7/2011 | Zang et al. |
| 2011/0202848 A1 | 8/2011 | Ismalon |
| 2011/0208822 A1 | 8/2011 | Rathod |
| 2011/0218946 A1 | 9/2011 | Stern et al. |
| 2011/0246566 A1 | 10/2011 | Kashef |
| 2011/0251896 A1 | 10/2011 | Impollonia et al. |
| 2011/0276680 A1 | 11/2011 | Rimon |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0133497 A1 | 5/2012 | Sasaki |
| 2012/0150890 A1 | 6/2012 | Jeong et al. |
| 2012/0167133 A1* | 6/2012 | Carroll ............... G06Q 30/0251 725/32 |
| 2012/0179642 A1 | 7/2012 | Sweeney et al. |
| 2012/0179751 A1 | 7/2012 | Ahn |
| 2012/0185445 A1 | 7/2012 | Borden et al. |
| 2012/0197857 A1 | 8/2012 | Huang |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0299961 A1 | 11/2012 | Ramkumar et al. |
| 2012/0301105 A1 | 11/2012 | Rehg et al. |
| 2012/0330869 A1 | 12/2012 | Durham |
| 2012/0331011 A1 | 12/2012 | Raichelgauz et al. |
| 2013/0018736 A1* | 1/2013 | Raichelgauz ........ H04H 20/103 705/14.73 |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0080433 A1 | 3/2013 | Raichelgauz et al. |
| 2013/0080868 A1* | 3/2013 | Raichelgauz ....... G06F 17/2235 715/205 |
| 2013/0086499 A1 | 4/2013 | Dyor et al. |
| 2013/0089248 A1 | 4/2013 | Remiszewski |
| 2013/0103814 A1 | 4/2013 | Carrasco |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0191323 A1* | 7/2013 | Raichelgauz ..... G06F 17/30592 707/603 |
| 2013/0191368 A1* | 7/2013 | Raichelgauz ..... G06F 17/30023 707/713 |
| 2013/0212493 A1 | 8/2013 | Krishnamurthy |
| 2013/0226820 A1 | 8/2013 | Sedota, Jr. |
| 2013/0226930 A1 | 8/2013 | Amgren et al. |
| 2013/0227023 A1* | 8/2013 | Raichelgauz .......... H04H 60/31 709/204 |
| 2013/0283401 A1 | 10/2013 | Pabla et al. |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta |
| 2014/0147829 A1 | 5/2014 | Jerauld |
| 2014/0152698 A1 | 6/2014 | Kim et al. |
| 2014/0169681 A1 | 6/2014 | Drake |
| 2014/0176604 A1 | 6/2014 | Venkitaraman et al. |
| 2014/0188786 A1* | 7/2014 | Raichelgauz .......... H04H 60/37 707/602 |
| 2014/0193077 A1 | 7/2014 | Shiiyama et al. |
| 2014/0201330 A1 | 7/2014 | Lozano Lopez |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1* | 10/2014 | Raichelgauz .......... G06F 21/629 726/30 |
| 2014/0330830 A1 | 11/2014 | Raichelgauz et al. |
| 2014/0341476 A1 | 11/2014 | Kulick et al. |
| 2014/0379477 A1 | 12/2014 | Sheinfeld |
| 2015/0033150 A1 | 1/2015 | Lee |
| 2015/0100562 A1 | 4/2015 | Kohlmeier et al. |
| 2015/0117784 A1 | 4/2015 | Lin |
| 2015/0120627 A1 | 4/2015 | Hunzinger et al. |
| 2015/0134688 A1 | 5/2015 | Jing |
| 2015/0154189 A1 | 6/2015 | Raichelgauz et al. |
| 2015/0254344 A1 | 9/2015 | Kulkarni et al. |
| 2015/0286742 A1 | 10/2015 | Zhang et al. |
| 2015/0289022 A1 | 10/2015 | Gross |
| 2015/0324356 A1 | 11/2015 | Gutierrez et al. |
| 2015/0363644 A1 | 12/2015 | Wnuk |
| 2016/0007083 A1 | 1/2016 | Gurha |
| 2016/0026707 A1 | 1/2016 | Ong et al. |
| 2016/0210525 A1 | 7/2016 | Yang |
| 2016/0221592 A1 | 8/2016 | Puttagunta |
| 2016/0239566 A1 | 8/2016 | Raichelgauz et al. |
| 2016/0306798 A1 | 10/2016 | Guo et al. |
| 2016/0342683 A1 | 11/2016 | Kwon |
| 2016/0357188 A1 | 12/2016 | Ansari |
| 2017/0017638 A1 | 1/2017 | Satyavarta et al. |
| 2017/0032257 A1 | 2/2017 | Sharifi |
| 2017/0041254 A1 | 2/2017 | Agara Venkatesha Rao |
| 2017/0109602 A1 | 4/2017 | Kim |
| 2017/0154241 A1 | 6/2017 | Shambik et al. |
| 2017/0255620 A1 | 9/2017 | Raichelgauz |
| 2017/0262437 A1 | 9/2017 | Raichelgauz |
| 2017/0323568 A1 | 11/2017 | Inoue |
| 2018/0081368 A1 | 3/2018 | Watanabe |
| 2018/0101177 A1 | 4/2018 | Cohen |
| 2018/0157916 A1 | 6/2018 | Doumbouya |
| 2018/0158323 A1 | 6/2018 | Takenaka |
| 2018/0204111 A1 | 7/2018 | Zadeh |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0065951 A1 | 2/2019 | Luo |
| 2019/0188501 A1 | 6/2019 | Ryu |
| 2019/0220011 A1 | 7/2019 | Della Penna |
| 2019/0317513 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |

(56) References Cited

U.S. PATENT DOCUMENTS

| | | |
|---|---|---|
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |

FOREIGN PATENT DOCUMENTS

| | | |
|---|---|---|
| WO | 0231764 A2 | 4/2002 |
| WO | 2003005242 A1 | 1/2003 |
| WO | 2003067467 A1 | 8/2003 |
| WO | WO 2004019527 A1 * | 3/2004 |
| WO | 2005027457 A1 | 3/2005 |
| WO | WO 2005027457 A1 * | 3/2005 |
| WO | 2007/0049282 | 5/2007 |
| WO | 2007049282 A2 | 5/2007 |
| WO | 2014137337 A1 | 9/2014 |
| WO | 2016040376 A1 | 3/2016 |
| WO | 2016070193 A1 | 5/2016 |

OTHER PUBLICATIONS

C-Y. Lin et al., "Generating Robust Digital Signature for Image/Video Authentication", Multimedia and Security Workshop at ACM Multimedia 1998, Bristol England, Sep. 1998.*

M. P. Queluz, "Content Based Integrity Protection of Digital Images", SPIE Conf. on Security and Watermarking of Multimedia Contents, San Jose, Jan. 1999.*

Wang J.Z. et al, "Classifying objectionable websites based on image content," IDMS (1998) 113-124, 1998.*

Gomes et al., "Audio Watermaking and Fingerprinting: For Which Applications?" University of Rene Descartes, Paris, France, 2003.

Nam, et al., "Audio Visual Content-Based Violent Scene Characterization", Department of Electrical and Computer Engineering, Minneapolis, MN, 1998, pp. 353-357.

Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

Ortiz-Boyer et al., "CIXL2: A Crossover Operator for Evolutionary Algorithms Based on Population Features", Journal of Artificial Intelligence Research 24 (2005) 1-48 Submitted Nov. 4; published Jul. 5.

IPO Examination Report under Section 18(3) for corresponding UK application No. GB1001219.3, dated May 30, 2012.

IPO Examination Report under Section 18(3) for corresponding UK application No. GB1001219.3, dated Sep. 12, 2011.

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Maass, W. et al.: "Computational Models for Generic Cortical Microcircuits", Institute for Theoretical Computer Science, Technische Universitaet Graz, Graz, Austria, published Jun. 10, 2003.

International Search Report for the corresponding International Patent Application PCT/IL2006/001235; dated Nov. 2, 2008.

Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin/Heidelberg ISSN: 1611-3349 ISBN: 978-3-540-26208-4.

Jaeger, H.: "The "echo state" approach to analysing and training recurrent neural networks", GMD Report, No. 148, 2001, pp. 1-43, XP002466251. German National Research Center for Information Technology.

Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.

Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.

Natsclager, T. et al.: "The "liquid computer": a novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.

International Search Authority: "Written Opinion of the International Searching Authority" (PCT Rule 43bis.1) including International Search Report for International Patent Application No. PCT/US2008/073852; dated Jan. 28, 2009.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; dated Jul. 28, 2009.

Clement, et al. "Speaker Diarization of Heterogeneous Web Video Files: A Preliminary Study", Acoustics, Speech 3nd Signal Processing (ICASSP), 2011, IEEE International Conference on Year: 2011, pp. 4432-4435, DOI: 10.1109/ICASSP.2011.5947337 IEEE Conference Publications, France.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 167-470, DOI: 10.1109/ISIMP.2004.1434102 IEEE Conference Publications, Hong Kong.

(56) References Cited

OTHER PUBLICATIONS

Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.

Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.20142359332 IEEE Journals & Magazines.

Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.

Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.

Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.

Wang et al. "A Signature for Content-based Image Retrieval Using a Geometrical Transform", ACM 1998, pp. 229-234.

Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.

Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.

Lin, et al., "Robust Digital Signature for Multimedia Authentication: A Summary", IEEE Circuits and Systems Magazine, 4th Quarter 2003, pp. 23-26.

May et al., "The Transputer", Springer-Verlag, Berlin Heidelberg, 1989, teaches multiprocessing system.

Vailaya, et al., "Content-Based Hierarchical Classification of Vacation Images," I.E.E.E: Multimedia Computing and Systems, vol. 1, 1999, East Lansing, MI, pp. 518-523.

Vallet, et al., "Personalized Content Retrieval in Context Using Ontological Knowledge," IEEE Transactions on Circuits and Systems for Video Technology, vol. 17, No. 3, Mar. 2007, pp. 336-346.

Whitby-Strevens, "The Transputer", 1985 IEEE, Bristol, UK.

Yanai, "Generic Image Classification Using Visual Knowledge on the Web," MM'03, Nov. 2-8, 2003, Tokyo, Japan, pp. 167-176.

Semizarov et al. "Specificity of Short Interfering RNA Determined through Gene Expression Signatures", PNAS, 2003, pp. 6347-6352.

Boari et al, "Adaptive Routing for Dynamic Applications in Massively Parallel Architectures", 1995 IEEE, Spring 1995.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Foote, Jonathan, et al. "Content-Based Retrieval of Music and Audio", 1997 Institute of Systems Science, National University of Singapore, Singapore (Abstract).

Guo et al, "AdOn: An Intelligent Overlay Video Advertising System", SIGIR, Boston, Massachusetts, Jul. 19-23, 2009.

Mandhaoui, et al, "Emotional Speech Characterization Based on Multi-Features Fusion for Face-to-Face Interaction", Universite Pierre et Marie Curie, Paris, France, 2009.

Marti, et al, "Real Time Speaker Localization and Detection System for Camera Steering in Multiparticipant Videoconferencing Environments", Universidad Politecnica de Valencia, Spain, 2011.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.

Ribert et al. "An Incremental Hierarchical Clustering", Visicon Interface 1999, pp. 586-591.

Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Theodoropoulos et al, "Simulating Asynchronous Architectures on Transputer Networks", Proceedings of the Fourth Euromicro Workshop on Parallel and Distributed Processing, 1996. PDP '96.

Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.

McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.

Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM.2015.7314122 IEEE Conference Publications.

Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.

Brecheisen, et al., "Hierarchical Genre Classification for Large Music Collections", ICME 2006, pp. 1385-1388.

Chuan-Yu Cho, et al., "Efficient Motion-Vector-Based Video Search Using Query by Clip", 2004, IEEE, Taiwan, pp. 1-4.

Ihab Al Kabary, et al., "SportSense: Using Motion Queries to Find Scenes in Sports Videos", Oct. 2013, ACM, Switzerland, pp. 1-3.

Jianping Fan et al., "Concept-Oriented Indexing of Video Databases: Towards Semantic Sensitive Retrieval and Browsing", IEEE, vol. 13, No. 7, Jul. 2004, pp. 1-19.

Shih-Fu Chang, et al., "VideoQ: A Fully Automated Video Retrieval System Using Motion Sketches", 1998, IEEE New York, pp. 1-2.

Wei-Te Li et al., "Exploring Visual and Motion Saliency for Automatic Video Object Extraction", IEEE, vol. 22, No. 7, Jul. 2013, pp. 1-11.

Odinaev, et al., "Cliques in Neural Ensembles as Perception Carriers", Technion—Israel Institute of Technology, 2006 International Joint Conference on Neural Networks, Canada, 2006, pp. 285-292.

The International Search Report and the Written Opinion for PCT/US2016/054634 dated Mar. 16, 2017, ISA/RU, Moscow, RU.

Yanagawa, et al., "Columbia University's Baseline Detectors for 374 LSCOM Semantic Visual Concepts." Columbia University ADVENT technical report, 2007, pp. 222-2006-8.

Johnson, John L, "Pulse-Coupled Neural Nets: Translation, Rotation, Scale, Distortion, and Intensity Signal Invariance for Images." Applied Optics, vol. 33, No. 26, 1994, pp. 6239-6253.

The International Search Report and the Written Opinion for PCT/US2016/050471, ISA/RU, Moscow, RU, dated May 4, 2017.

The International Search Report and the Written Opinion for PCT/US2017/015831, ISA/RU, Moscow, Russia, dated Apr. 20, 2017.

Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Hogue, "Tree Pattern Inference and Matching for Wrapper Induction on the World Wide Web", Master's Thesis, Massachusetts Institute of Technology, Jun. 2004, pp. 1-106.

(56) References Cited

OTHER PUBLICATIONS

Hua et al., "Robust Video Signature Based on Ordinal Measure", Image Processing, 2004, 2004 International Conference on Image Processing (ICIP), vol. 1, IEEE, pp. 685-688, 2004.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
McNamara et al., "Diversity Decay in opportunistic Content Sharing Systems", 2011 IEEE International Symposium on a World of Wireless, Mobile and Multimedia Networks, pp. 1-3.
Odinaev et al, "Cliques in Neural Ensembles as Perception Carriers", Technion—Institute of Technology, 2006 International Joint Conference on neural Networks, Canada, 2006, pp. 285-292.
Queluz, "Content-Based Integrity Protection of Digital Images", SPIE Conf. on Security and Watermarking of Multimedia Contents, San Jose, Jan. 1999, pp. 85-93.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Schneider et al, "A Robust Content based Digital Signature for Image Authentication", Proc. ICIP 1996, Lausane, Switzerland, Oct. 1996, pp. 227-230.
Wilk et al., "The Potential of Social-Aware Multimedia Prefetching on Mobile Devices", International Conference and Workshops on networked Systems (NetSys), 2015, pp. 1-5.
Yanagawa et al., "Columbia University's Baseline Detectors for 374 LSCOM Semantic Visual Concepts", Columbia University Advent Technical Report #222, 2007, pp. 2006-2008.
Zou et al., "A Content-Based Image Authentication System with Lossless Data Hiding", ICME 2003, pp. 213-216.
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
"Computer Vision Demonstration Website", Electronics and Computer Science, University of Southampton, 2005, USA.
Boari et al, "Adaptive Routing for Dynamic Applications in Massively Parallel Architectures", 1995 IEEE, Spring 1995, pp. 1-14.
Cernansky et al, "Feed-forward Echo State Networks", Proceedings of International Joint Conference on Neural Networks, Montreal, Canada, Jul. 31-Aug. 4, 2005, pp. 1-4.
Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al, "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Guo et al, AdOn: An Intelligent Overlay Video Advertising System (Year: 2009).
Howlett et al, "A Multi-Computer Neural Network Architecture in a Virtual Sensor System Application", International journal of knowledge-based intelligent engineering systems, 4 (2). pp. 86-93, 133N 1327-2314.
International Search Report and Written Opinion for PCT/US2016/050471, ISA/RU, Moscow, RU, dated May 4, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Li et al ("Matching Commercial Clips from TV Streams Using a Unique, Robust and Compact Signature" 2005) (Year: 2005).
Lin et al., "Generating robust digital signature for image/video authentication", Multimedia and Security Workshop at ACM Multimedia '98, Bristol, U.K., Sep. 1998, pp. 245-251.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
May et al, "The Transputer", Springer-Verlag Berlin Heidelberg 1989, vol. 41.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on CONTROL '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Stolberg et al, "HIBRID-SOC: A Multi-Core SOC Architecture for Multimedia Signal Processing", 2003 IEEE, pp. 189-194.
Theodoropoulos et al, "Simulating Asynchronous Architectures on Transputer Networks", Proceedings of the Fourth Euromicro Workshop on Parallel and Distributed Processing, 1996. PDP '96, pp. 274-281.
Vallet et al ("Personalized Content Retrieval in Context Using Ontological Knowledge" Mar. 2007) (Year: 2007).
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Stevens, "The transputer", 1985 IEEE, pp. 292-300.
Yanagawa et al, "Columbia University's Baseline Detectors for 374 LSCOM Semantic Visual Concepts", Columbia University Advent Technical Report # 222-2006-8, Mar. 20, 2007, pp. 1-17.
Zhou et al, "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.
Jasinschi et al., A Probabilistic Layered Framework for Integrating Multimedia Content and Context Information, 2002, IEEE, p. 2057-2060. (Year: 2002).
Jones et al., "Contextual Dynamics of Group-Based Sharing Decisions", 2011, University of Bath, p. 1777-1786. (Year: 2011).
Iwamoto, "Image Signature Robust to Caption Superimpostion for Video Sequence Identification", IEEE, pp. 3185-3188 (Year: 2006).
Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).
Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).
Wusk et al (Non-Invasive detection of Respiration and Heart Rate with a Vehicle Seat Sensor; www.mdpi.com/journal/sensors; Published: May 8, 2018). (Year: 2018).

(56) References Cited

OTHER PUBLICATIONS

Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).

* cited by examiner

SYSTEM AND METHOD FOR IDENTIFYING THE CONTEXT OF MULTIMEDIA CONTENT ELEMENTS DISPLAYED IN A WEB-PAGE AND PROVIDING CONTEXTUAL FILTERS RESPECTIVE THERETO

CROSS-REFERENCE TO RELATED APPLICATIONS

This application claims the benefit of U.S. Provisional Application No. 61/773,349 filed on Mar. 6, 2013, the contents of which are herein incorporated by reference. This application is also a continuation-in-part (CIP) of U.S. patent application Ser. No. 13/624,397 filed on Sep. 21, 2012, now pending, which is a CIP of:

(a) U.S. patent application Ser. No. 13/344,400 filed on Jan. 5, 2012, now pending, which is a continuation of U.S. patent application Ser. No. 12/434,221, filed May 1, 2009, now U.S. Pat. No. 8,112,376;

(b) U.S. patent application Ser. No. 12/084,150 filed on Apr. 7, 2009, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006; and, (c) U.S. patent application Ser. No. 12/195,863, filed Aug. 21, 2008, now U.S. Pat. No. 8,326,775, which claims priority under 35 USC 119 from Israeli Application No. 185414, filed on Aug. 21, 2007, and which is also a continuation-in-part (CIP) of the above-referenced U.S. patent application Ser. No. 12/084,150.

All of the applications referenced above are herein incorporated by reference for all that they contain.

TECHNICAL FIELD

The present invention relates generally to the analysis of multimedia content displayed in a web-page, and more specifically to a system for editing and filtering the context of multimedia content.

BACKGROUND

A web page is a document that is suitable for the World Wide Web and can be accessed through a web browser. Web pages generally contain other resources such as style sheets, scripts, and multimedia content elements in their final presentation. That is, media-rich web pages usually include information as to the colors of text, backgrounds, and links to multimedia content elements to be included in the final presentation when rendered by the web browser. A multimedia content element may include an image, graphics, a video stream, a video clip, an audio stream, an audio clip, and the like.

Web pages may consist of static or dynamic multimedia content elements retrieved from a web server's file system or by a web application. For example, a Facebook® page may include static images, such as a profile picture, and also dynamic contents of such pictures and/or video clips fed by other users.

In the related art there are different techniques for identifying the context of a web page. For example, the context may be determined based on the domain name of a web page mapped to a category (e.g., news, sports, etc.), textual analysis of the web page, or by information embedded in the web page by a programmer of the page. Although such techniques may be efficient in determining the context of static web pages, they cannot provide the current context of the web page that is dynamically changed. Further, the granularity of such context analysis may be in most cases, high level (e.g., news) without providing the context of the current content or topic (e.g., election of a particular candidate) presented in the web page.

Furthermore, there is no available solution to determine the context of a web page based on multimedia content elements presented therein and specifically, dynamic elements. Extraction of individual multimedia content elements in the web page through the identification of a plurality of multimedia content elements to determine that their respective context is not discussed in the related art. As noted above, in a web page some of the multimedia content elements are static, such as background colors or images. However, such images can provide little information about the current context of the information presented in the web page. The dynamic elements often provide information that more accurately reflects the real story behind the current state of the web page.

It would therefore be advantageous to provide a solution that would overcome the deficiencies of the prior art by identifying a plurality of elements within multimedia content and determining the context of the multimedia content. It would be further advantageous if such a solution enable to editing and filtering of the context of the multimedia content.

SUMMARY

Certain embodiments disclosed herein include a method and system for providing contextual filters respective of an identified context of a plurality of multimedia content elements are provided. The method comprises receiving the plurality of multimedia content elements; generating at least one signature for each of the plurality of multimedia content elements; determining a context of each of the plurality of multimedia content elements based on its respective at least one signature, wherein a context is determined as the correlation among a plurality of cluster of signatures; and providing at least one contextual filter respective of the context of each of the plurality of multimedia content elements.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
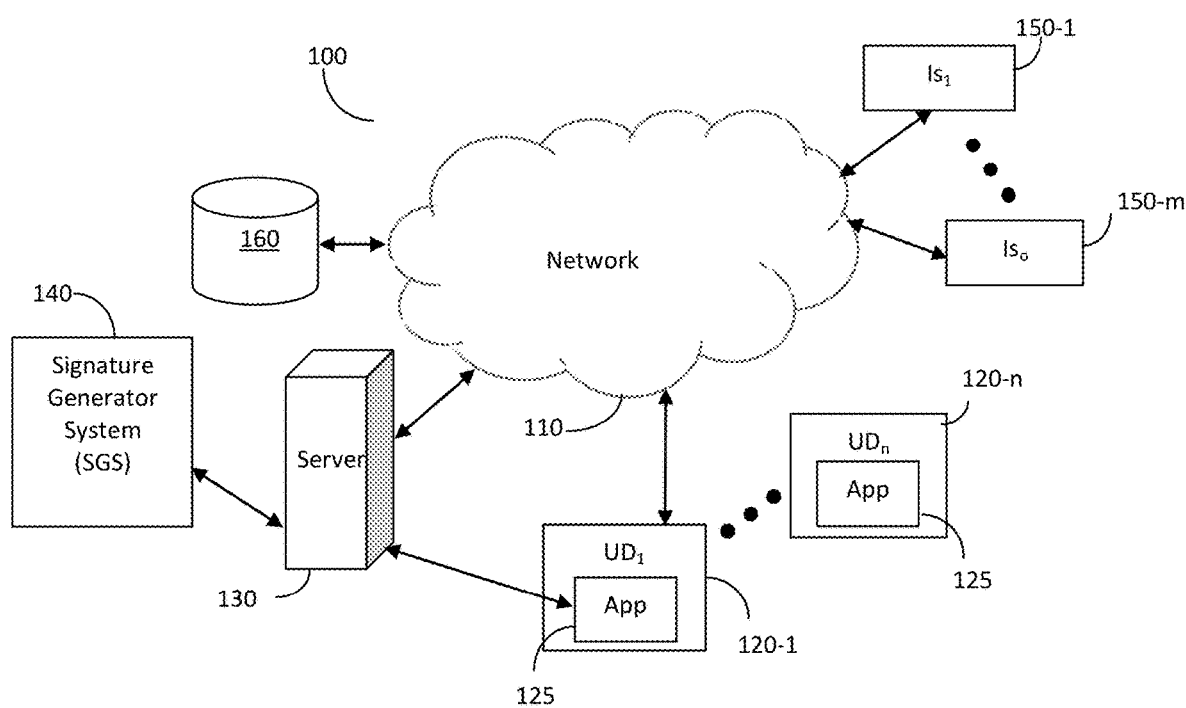
FIG. 1 is a schematic block diagram of a network system utilized to describe the various embodiments disclosed herein.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein provide a system and method that determine the context of one or more multimedia content elements, or portions thereof and provide one or more contextual filters respective thereto. Accordingly, at least one signature is generated for each multimedia content element, or portion thereof displayed. Then, the signatures are analyzed to determine the concept of each of the signatures and the context of the one or more multimedia content elements respective thereto. In one embodiment, the one or more multimedia content elements are extracted from a web-page. One or more contextual filters are then provided to the user respective of the concept of each of the signatures and the context of the one or more multimedia content elements respective thereto. The contextual filters enable a user to edit one or more elements within the multimedia content.

FIG. 1 shows an exemplary and non-limiting schematic diagram of a network system 100 utilized to describe the various embodiments disclosed herein. A network 110 is used to communicate between different parts of the system 100. The network 110 may be the Internet, the world-wide-web (WWW), a local area network (LAN), a wide area network (WAN), a metro area network (MAN), and other networks capable of enabling communication between the elements of the system 100.

Further connected to the network 110 are one or more user devices 120-1 through 120-n (collectively referred to hereinafter as user devices 120 or individually as a user device 120) through one or more client applications 125. A user device 120 may be, for example, a personal computer (PC), a personal digital assistant (PDA), a mobile phone, a smart phone, a tablet computer, a wearable computing device, and other kinds of wired and mobile appliances, equipped with browsing, viewing, listening, filtering, and managing capabilities, etc., that are enabled as further discussed herein below.

The system 100 also includes a plurality of information sources 150-1 through 150-m (collectively referred to hereinafter as information sources 150 or individually as information sources 150) being connected to the network 110. Each of the information sources 150 may be, for example, a web server, an application server, a publisher server, an ad-serving system, a data repository, a database, and the like. Also connected to the network 110 is a data warehouse 160 that stores multimedia content elements, clusters of multimedia content elements, and the context determined for a web page as identified by its URL. In the embodiment illustrated in FIG. 1, a context server 130 communicates with the data warehouse 160 through the network 110. In other non-limiting configurations, the context sever 130 is directly connected to the data warehouse 160.

The various embodiments disclosed herein are realized using the context server 130 and a signature generator system (SGS) 140. The SGS 140 may be connected to the context server 130 directly or through the network 110. The context server 130 is enabled to receive and serve multimedia content elements and causes the SGS 140 to generate a signature respective of the multimedia content elements. The process for generating the signatures for multimedia content is explained in more details herein below with respect to FIGS. 3 and 4. It should be noted that each of the context server 130 and the SGS 140 typically comprises a processing unit, such as a processor (not shown) that is coupled to a memory. The memory contains instructions that can be executed by the processing unit. The transaction of the context server 130 also includes an interface (not shown) to the network 110.

According to the disclosed embodiments, the context server 130 is configured to receive at least a URL of a web page hosted in an information source 150 and accessed by a user device 120. The context server 130 is further configured to analyze the multimedia content elements contained in the web page to determine their context, thereby ascertaining the context of the web page. This is performed based on at least one signature generated for each multimedia content element. It should be noted that the context of an individual multimedia content element or a group of elements is extracted from the web page, received from a user device 120 (e.g., uploaded video clip), or retrieved from the data warehouse 160.

A user visits a web-page using a user device 120. When the web-page is uploaded on the user device 120, a request is sent to the context server 130 to analyze the multimedia content elements contained in the web-page. The request to analyze the multimedia content elements can be generated and sent by a script executed in the web-page, an agent installed in the web-browser, or by one of the information sources 150 (e.g., a web server or a publisher server) when requested to upload one or more advertisements to the web-page. The request to analyze the multimedia content may include a URL of the web-page or a copy of the web-page. In one embodiment, the request may include multimedia content elements extracted from the web-page. A multimedia content element may include, for example, an image, a graphic, a video stream, a video clip, an audio stream, an audio clip, a video frame, a photograph, and an image of signals (e.g., spectrograms, phasograms, scalograms, etc.), and/or combinations thereof and portions thereof.

The context server 130 is configured to analyze the multimedia content elements in the web-page to determine their context. For example, if the web page contains images of palm trees, a beach, and the coast line of San Diego, the context of the web page may be determined to be "California sea shore." The determined context can be utilized to detect one or more matching advertisements for the multimedia content elements. According to this embodiment, the SGS 140 generates for each multimedia content element provided by the context server 130 at least one signature. The generated signature(s) may be robust to noise and distortion as discussed below. Then, using the generated signature(s), the context server 130 determines the context of the elements and searches the data warehouse 160 for a matching advertisement based on the context. For example, if the signature of an image indicates a "California sea shore", then an advertisement for a swimsuit can be a potential matching advertisement.

It should be noted that using signatures for determining the context and thereby for the searching of advertisements ensures more accurate reorganization of multimedia content than, for example, when using metadata instead. For instance, in order to provide a matching advertisement for a sports car it may be desirable to locate a car of a particular model. However, in most cases the model of the car would not be part of the metadata associated with the multimedia content (image). Moreover, the car shown in an image may be at angles different from the angles of a specific photograph of the car that is available as a search item.

It should be appreciated that the signature generated for that image would enable accurate recognition of the model of the car because the signatures generated for the multimedia content elements, according to the disclosed embodiments, allow for recognition and classification of multimedia content elements, such as content-tracking, video filtering, multimedia taxonomy generation, video fingerprinting, speech-to-text, audio classification, element recognition, video/image search and any other application requiring content-based signatures generation and matching for large content volumes such as, web and other large-scale databases.

In one embodiment, the signatures generated for more than one multimedia content element are clustered. The clustered signatures are used to determine the context of the web page and to search for a matching advertisement. It should be noted that other content items that are not advertisements may be determined. The one or more selected matching advertisements are retrieved from the data warehouse 160 and uploaded to the web-page on the web browser 120.

Figure 2:
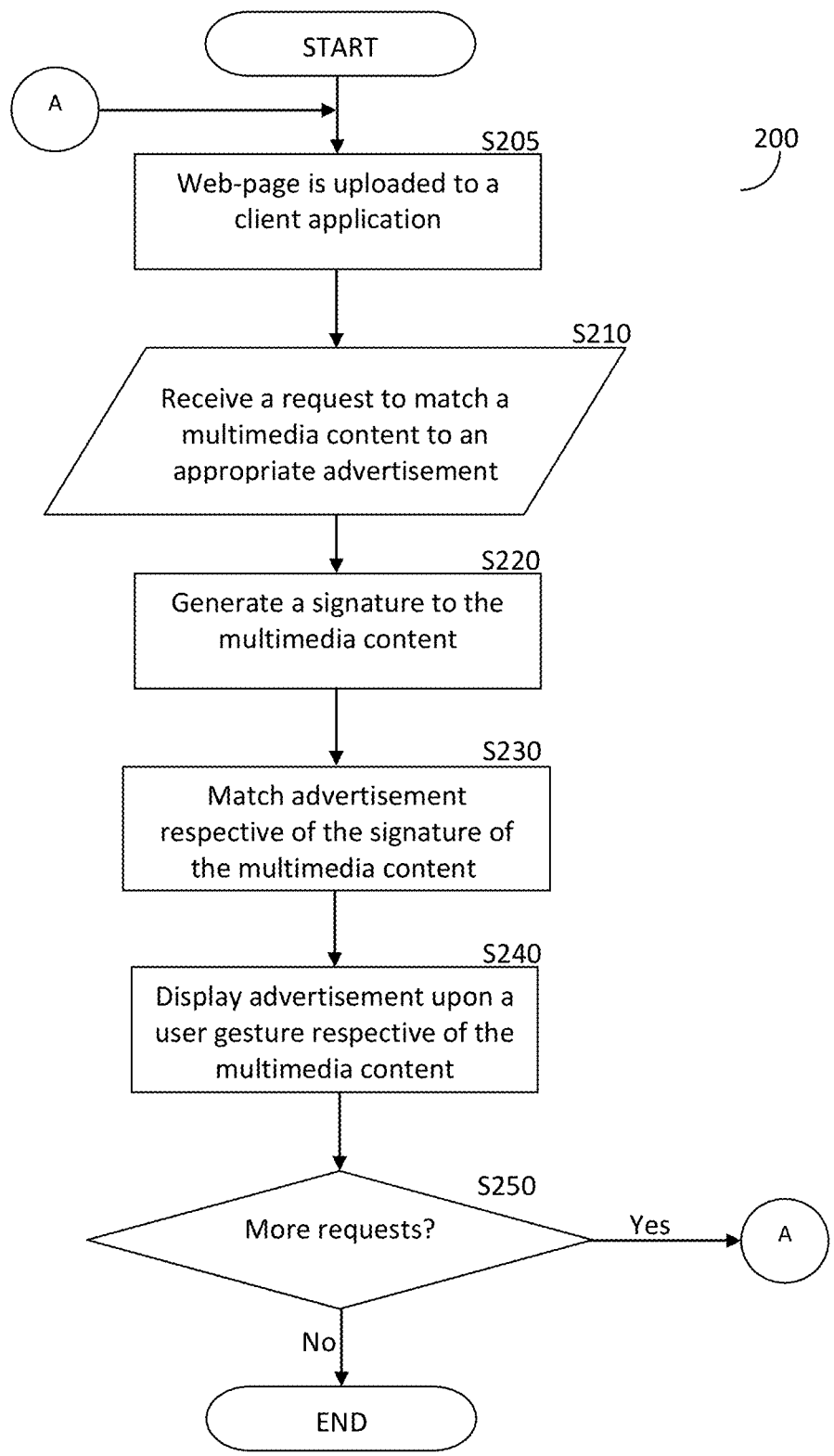
FIG. 2 is a flowchart describing the process of matching an advertisement to a multimedia content element displayed on a web-page.

FIG. 2 depicts an exemplary and non-limiting flowchart 200 describing the process of matching an advertisement to multimedia content displayed on a web-page. In S205, a web-page is uploaded to one of the client applications (e.g., client application 125). In S210, a request to match at least one multimedia content element contained in the uploaded web-page to an appropriate advertisement item is received. The request can be received from a publisher server, a script running on the uploaded web-page, or the client application 125. S210 can also include extracting the multimedia content elements for a signature that should be generated.

In S220, at least one signature for the multimedia content element executed from the web page is generated. The signature for the multimedia content element generated by a signature generator is described below with respect to FIGS. 3 and 4. In one embodiment, based on the generated signatures, the context of the extracted multimedia content elements, and thereby the web page, is determined as described below with respect to FIG. 6.

In S230, an advertisement item is matched to the multimedia content element respective of its generated signatures and/or the determined context. The matching process includes searching for at least one advertisement item respective of the signature of the multimedia content and a display of the at least one advertisement item within the display area of the web-page. The signatures generated for the multimedia content elements are clustered and the cluster of signatures is matched to one or more advertisement items. The matching of an advertisement to a multimedia content element can be performed by the computational cores that are part of a large scale matching discussed in detail below.

In S240, upon a user's gesture the advertisement item is uploaded to the web-page and displayed therein. The user's gesture may be: a scroll on the multimedia content element, a press on the multimedia content element, and/or a response to the multimedia content. This ensures that the user's attention is given to the advertised content. In S250, it is checked whether there are additional requests to analyze multimedia content elements, and if so, execution continues with S210; otherwise, execution terminates.

As a non-limiting example, an image that contains a plurality of multimedia content elements is identified by the context server 130 in an uploaded web-page. The SGS 140 generates at least one signature for each multimedia content element executed from the image that exists in the web page. According to this example a printer and a scanner are shown in the image and the SGS 140 generates signatures respective thereto. The server 130 is configured to determine that the context of the image is office equipment. Therefore, the context server 130 is configured to match at least one advertisement suitable for office equipment.

Figure 3:
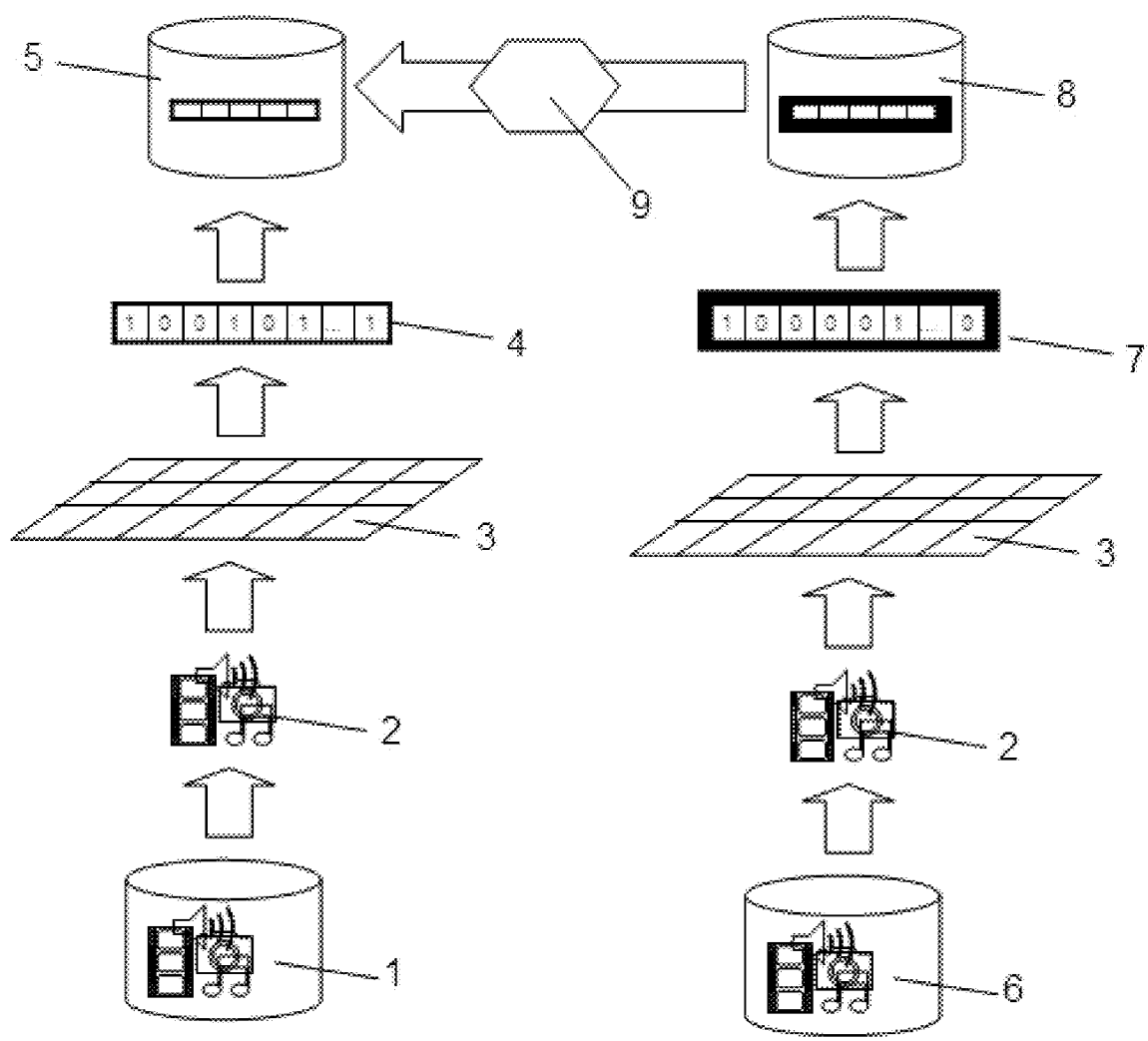
FIG. 3 is a block diagram depicting the basic flow of information in the signature generator system.
Figure 4:
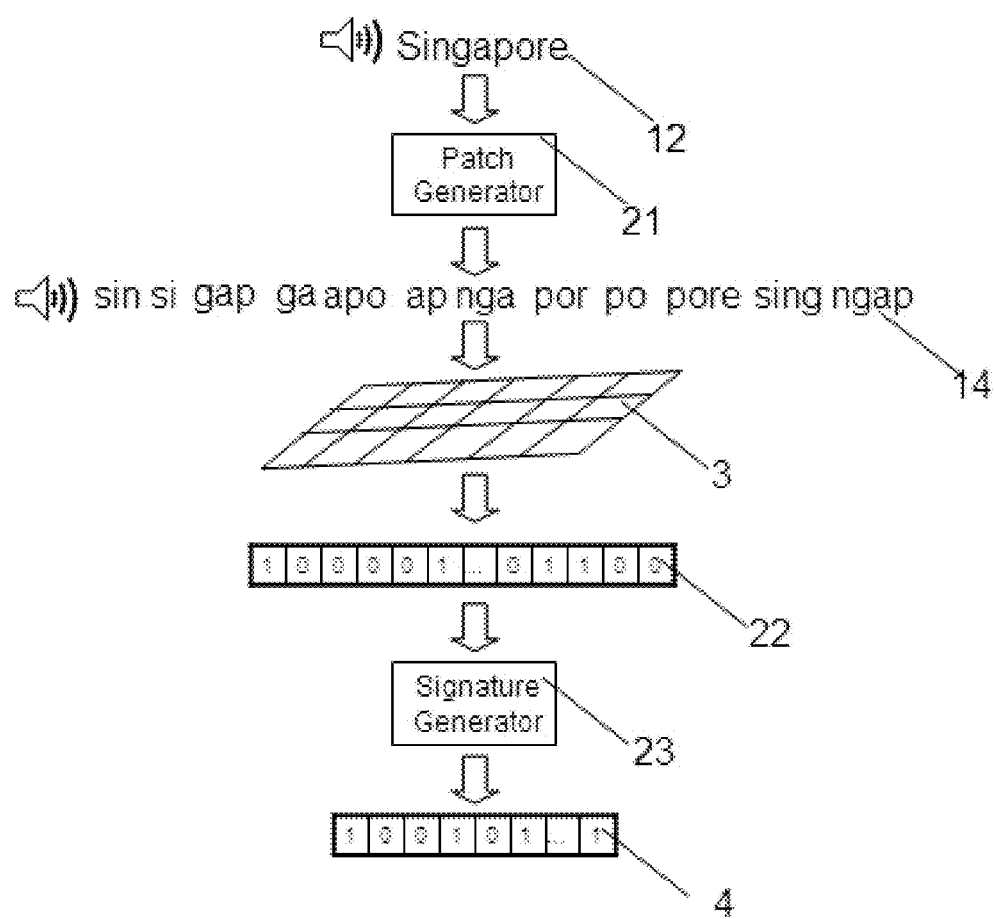
FIG. 4 is a diagram showing the flow of patches generation, response vector generation, and signature generation in a large-scale speech-to-text system.

FIGS. 3 and 4 illustrate the generation of signatures for the multimedia content elements by the SGS 140 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process is now described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the context server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame T is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core Ci={ni} (1≤i≤L) may consist of a single leaky integrate-to-threshold unit (LTU) node or more nodes. The node $n_i$ equations are:

$$V_i = \sum_j w_{ij} k_j$$

$$n_i = \Box(V_i - Th_x)$$

where, $\Box$ is a Heaviside step function; $w_{ij}$ is a coupling node unit (CNU) between node i and image component j (for example, grayscale value of a certain pixel j); kj is an image component 'j' (for example, grayscale value of a certain pixel j); $Th_x$ is a constant Threshold value, where 'x' is 'S' for Signature and 'RS' for Robust Signature; and Vi is a Coupling Node Value.

The Threshold values $Th_x$ are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For: $V_i > Th_{RS}$
   $1-p(V > Th_S) - 1 - (1-\varepsilon)^1 << 1$ i.e., given that l nodes (cores) constitute a Robust Signature of a certain image I, the probability that not all of these I nodes will belong to the Signature of same, but noisy image, $\bar{I}$ is sufficiently low (according to a system's specified accuracy).

2: $p(V_i > Th_{RS}) \approx 1/L$ i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in U.S. Pat. No. 8,655,801 referenced above.

Figure 5:
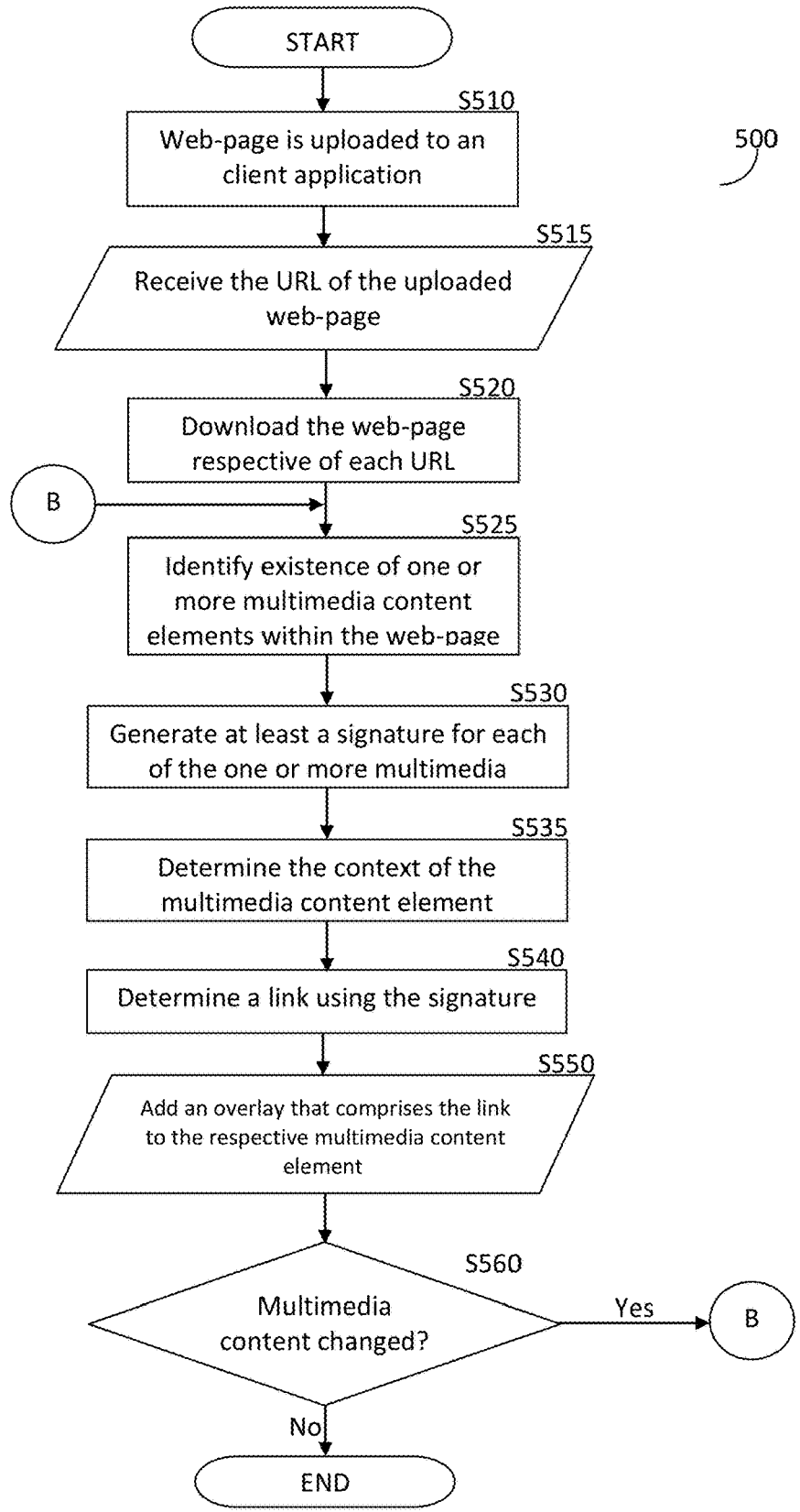
FIG. 5 is a flowchart describing a process of adding an overlay to multimedia content displayed on a web-page.

FIG. 5 depicts an exemplary and non-limiting flowchart 500 describing the process of adding an overlay to multimedia content displayed on a web-page according to one embodiment. In S510, the process starts when a web-page is uploaded to a client application (e.g., client application 125) or when an information source (e.g., information source 150-1) receives a request to host the requested web-page. In S515, the context server 130 receives the uniform resource locator (URL) of the uploaded web-page. In another embodiment, the uploaded web-page includes an embedded script. The script extracts the URL of the web-page, and sends the URL to the context server 130. In another embodiment, an add-on installed in the web-browser executed by a user device 120 extracts the URL of the uploaded web-page, and sends the URL to the context server 130. In yet another embodiment, an agent is installed on a user device executing the web browser executed by a user device 120. The agent is configured to monitor web-pages uploaded to the website, extract the URLs, and send them to the server context 130. In another embodiment, a web-server (e.g., information source 150) hosting the requested web-page provides the context server 130 with the URL of the requested web-page. It should be noted that only URLs of selected web sites can be sent to the context server 130, for example, URLs related to web-sites that paid for the additional information.

In S520, the web-page respective of each received URL is downloaded to the context server 130. In S525, the web-page is then analyzed in order to identify the existence of at least one or more multimedia content elements in the uploaded web-page. It should be understood that a multimedia content element, such as an image or a video, may include a plurality of multimedia content elements. In S530, for each multimedia content element identified by the context server 130, at least one signature is generated. The signatures for the multimedia content elements are generated as described in greater detail above.

In S535, respective of each signature, the context of the multimedia content element is determined. The determination of context based on the signatures is discussed in more detail below. In S540, respective of the context or the signature of the elements, the context server 130 determines one or more links to content that exist on an information source, for example, an information source 150 that can be associated with the multimedia content element. A link may be a hyperlink, a URL, and the like to external resource information.

That is, the content accessed through the link may be, for example, informative web-pages such as a page from the Wikipedia® website. The determination of the link may be made by identification of the context of the signatures generated by the context server 130. As an example, if the context of the multimedia content elements was identified as a football player, then a link to a sports website that contains information about the football player is determined.

In S550, the determined link to the content is added as an overlay to the web-page by the context server 130, respective of the corresponding multimedia content element. According to one embodiment, a link that contains the overlay may be provided to a web browser (e.g., a web browser executed by user device 120-1) respective of a user's gesture. A user's gesture may be: a scroll on the multimedia content element, a click on the at least one multimedia content element, and/or a response to the at least one multimedia content or portion thereof.

The modified web-page that includes at least one multimedia content element with the added link can be sent directly to the web browser requesting the web-page. This requires establishing a data session between the context server 130 and the web browsers. In another embodiment, the multimedia element including the added link is returned to a web server (e.g., information source 150) hosting the requested web-page. The web server returns the requested web-page with the multimedia element containing the added link to the web browser requesting the web-page. Once the "modified" web-page is displayed over the web browser on user device 120-1, a detected user's gesture over the multimedia element would cause the web browser to upload the content (e.g., a Wikipedia web-page) accessed by the link added to the multimedia element.

In S560, it is checked whether the one or more multimedia content elements contained in the web-page has changed, and if so, execution continues with S525; otherwise, execution terminates.

As a non-limiting example, a web-page containing an image of the movie "Pretty Woman" is uploaded to the context server 130. A signature is generated by the SGS 140 respective of the actor Richard Gere and the actress Julia Roberts, both shown in the image. The context of the signatures according to this example may be "American Movie Actors". An overlay containing the links to Richard Gere's biography and Julia Roberts' biography on the Wikipedia® website is added over the image such that upon detection of a user's gesture, for example, a mouse clicking over the part of the image where Richard Gere is shown, the link to Richard Gere's biography on Wikipedia® is provided to the user.

As a non-limiting example, a web-page that contains an embedded video clip is requested by a web browser executed by a user device 120-1 from an information source 150-1 and a banner advertising New York City. The context server 130 receives the requested URL. The context server 130 analyzes the video content and the banner within the requested web-page and a signature is generated by the SGS 140 respective of the entertainer Madonna that is shown in the video content and the banner. The context of multimedia content embedded in the web page is determined to be "live pop shows in NYC." In response to the determined context, a link to a hosted web site for purchasing show tickets is added as an overlay to the video clip. The web-page together with the added link is sent to a web server (e.g., an information source 150-1), which then uploads the requested web-page with the modified video element to the web-browser.

The web-page may contain a number of multimedia content elements; however, in some instances only a few links may be displayed in the web-page. Accordingly, in one embodiment, the signatures generated for the multimedia content elements are clustered and the cluster of signatures is matched to one or more advertisement items.

Figure 6:
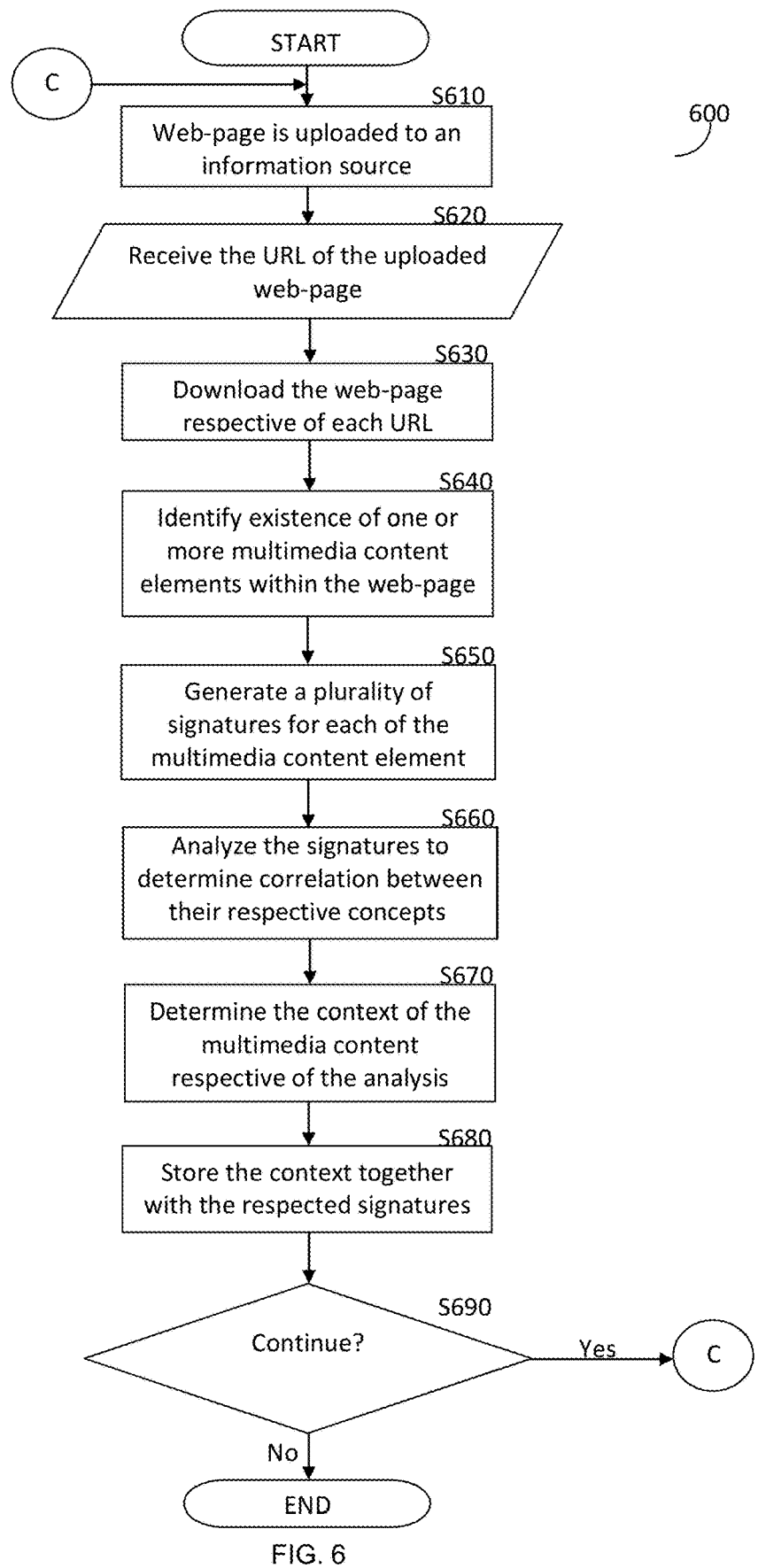
FIG. 6 is a flowchart describing a method for determining the context indicated by the relation between multimedia content elements displayed in a web-page according to one embodiment.

FIG. 6 shows an exemplary and non-limiting example for determining a context of a multimedia content according to one embodiment. The method may be performed by the context server 130. In S610, a web-page is uploaded to a web-browser (e.g., a web-browser executed by user device 120-1). In another embodiment, the method starts when a web server (e.g., information source 150-1) receives a request to host the requested web-page.

In S620, the uniform resource locator (URL) of the web-page to be processed is received. In another embodiment, the uploaded web-page includes an embedded script. The script extracts the URL of the web-page, and sends the URL to the context server 130. In another embodiment, an add-on installed in the web-browser executed by a user device 120-1 extracts the URL of the uploaded web-page, and sends the URL to the context server 130. In yet another embodiment, client application 125 is configured to monitor web-pages uploaded to the web-site, extract the URLs, and send them to the context server 130. In another embodiment, the web-server (e.g., an information source 150-1) hosting the requested web-page, provides the context server 130 with the URL of the requested web-page. It should be noted that only URLs of selected web sites can be sent to the context server 130, for example, URLs related to web-sites that paid for the additional information.

In S630, the web-page respective of each received URL is downloaded to the context server 130. In S640, the web-page is then analyzed in order to identify the existence of one or more multimedia content elements in the uploaded web-page. Each identified multimedia content element is extracted from the web-page and sent to the SGS 140.

In S650, at least one signature generated for each identified multimedia content element is received by the context server 130. The at least one signature is generated by the SGS and is robust for noise and distortion. The signatures for the multimedia content elements are generated as described in greater detail above. It should also be noted that signatures can be generated for portions of a multimedia content element.

In S660, the correlation between the signatures of all extracted multimedia content elements, or portions thereof is analyzed. Specifically, each signature represents a different concept. The signatures are analyzed to determine the correlation concepts. A concept is an abstract description of the content to which the signature was generated. For example, a concept of the signature generated for a picture showing a bouquet of red roses is "flowers." The correlation between concepts can be achieved by identifying a ratio between signatures' sizes, a spatial location of each signature, and so on using probabilistic models. As noted above a signature represents a concept and is generated for a multimedia content element. Thus, identifying, for example, the ratio of signatures' sizes may also indicate the ratio between the sizes of their respective objects and entities captured in their respective multimedia elements.

A context is determined as the correlation among a plurality of concepts. A strong context is determined when there are more concepts, or the plurality of concepts, that satisfy the same predefined condition. An example for such context determination using signatures is disclosed in a co-pending U.S. patent application Ser. No. 13/766,463, filed Feb. 13, 2013, entitled "A SYSTEM AND METHODS FOR GENERATION OF A CONCEPT BASED DATABASE", assigned to common assignee, which is hereby incorporated by reference for all the useful information it contains. As an example, the server 130 analyzes signatures generated for multimedia content elements of a smiling child with a Ferris wheel in the background. The concept of the signature of the smiling child is "amusement" and the concept of a signature of the Ferris wheel is "amusement park." The server 130 further analyzes the relation between the signatures of the child and recognized wheel, to determine that the Ferris wheel is bigger than the child. The relation analysis determines that the Ferris wheel is used to entertain the child. Therefore, the determined context may be "amusement."

According to one embodiment, the context server 130 uses one or more typically probabilistic models to determine the correlation between signatures representing concepts. The probabilistic models determine, for example, the probability that a signature may appear in the same orientation and in the same ratio as another signature. When performing the analysis, the context server 130 utilizes information maintained in the data warehouse 160, for example, signatures previously analyzed. In S670, the context server 130 determines, based on the analysis performed in S660, the context of a plurality of multimedia content elements that exist in the web-page and in the context of the web-page.

As an example, an image that contains a plurality of multimedia content elements is identified by the context server 130 in an uploaded web-page. The SGS 140 generates at least one signature for each of the plurality of multimedia content elements that exist in the image. According to this example, the multimedia contents of the singer "Adele," the "red carpet," and a "Grammy" award are shown in the image. The SGS 140 generates signatures respective thereto. The context server 130 analyzes the correlation between "Adele," the "red carpet," and a "Grammy" award and determines the context of the image based on the correlation. According to this example such a context may be "Adele Winning the Grammy Award".

The following is another non-limiting example demonstrating the operation of the server 130. In this example, a web page containing a plurality of multimedia content elements is identified by the context server 130 in an uploaded web-page. According to this example, the SGS 140 generates signatures for the objects such as a "glass," a piece of "cutlery," and a "plate" which appear in the multimedia elements. The context server 130 then analyzes the correlation between the concepts generated by signatures respective of the data maintained in the data warehouse 160, for example, analysis of previously generated signatures. According to this example, as all of the concepts "glass," "cutlery," and "plate" satisfy the same predefined condition, a strong context is determined. The context of such concepts may be a "table set". The context can be also determined respective of a ratio of the sizes of the objects (glass, cutlery, and plate) in the image and the distinction of their spatial orientation.

In S680, the context of the multimedia content together with the respective signatures is stored in the data warehouse 160 for future use. In S690, it is checked whether there are additional web-pages and if so execution continues with S610; otherwise, execution terminates.

Figure 7:
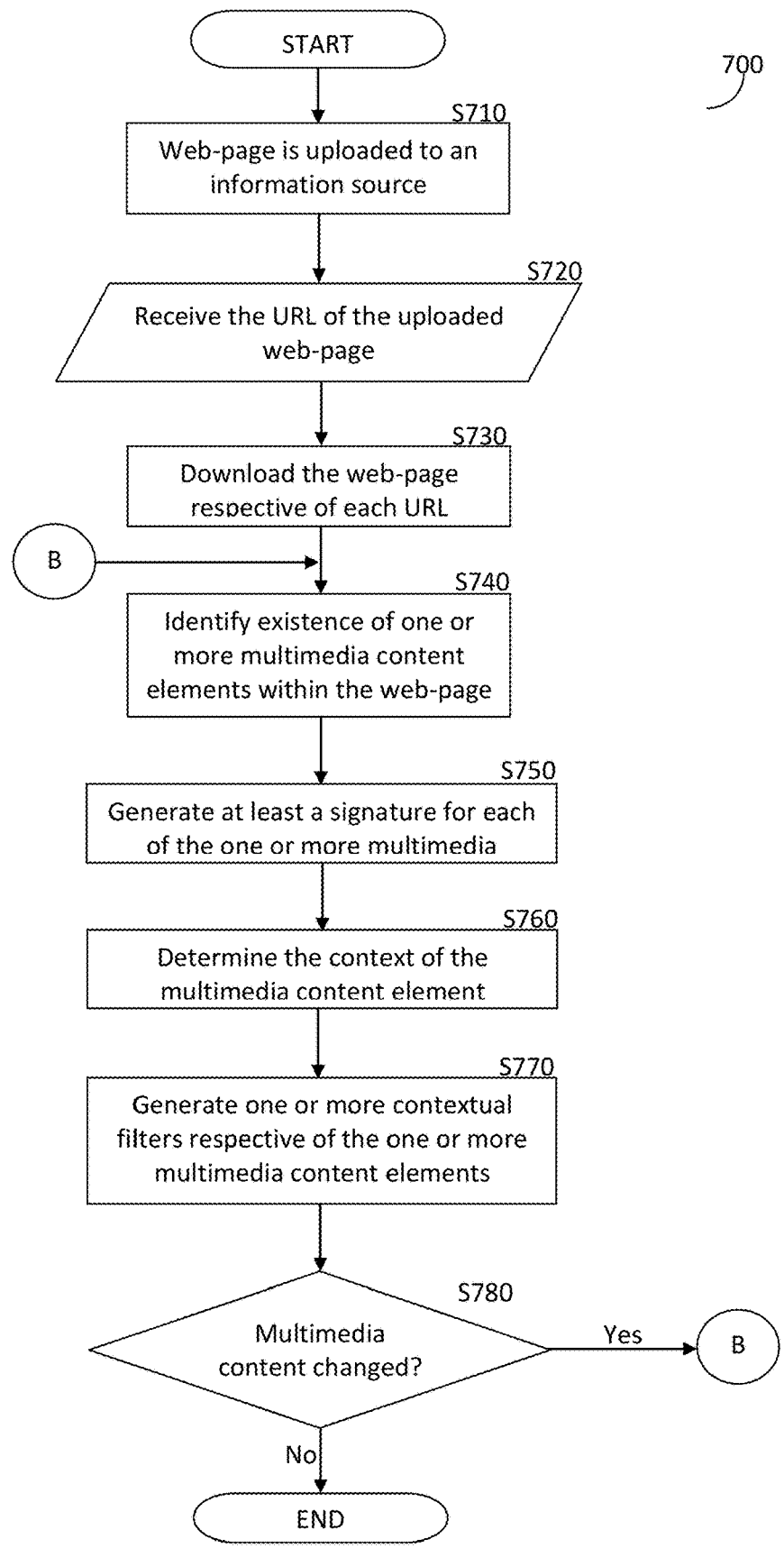
FIG. 7 is a flowchart describing a method for providing one or more contextual filters according to one embodiment.

FIG. 7 depicts an exemplary and non-limiting flowchart 700 describing the process of providing contextual filters according to one embodiment. The method may be performed by the context server 130. In S710, the method starts when a web-page is uploaded to a web-browser (e.g., web-browser executed by user device 120-1) or when a web-server (e.g., information source 150-1) receives a request to host the requested web-page. In S720, the uniform resource locator (URL) of the uploaded web-page is received at the context server 130.

In another embodiment, the uploaded web-page includes an embedded script. The script extracts the URL of the web-page, and sends the URL to the context server 130. In another embodiment, an add-on installed in the web-browser extracts the URL of the uploaded web-page, and sends the URL to the context server 130. In yet another embodiment, an agent is installed on a user device executing the web browser. The agent is configured to monitor web-pages uploaded to the web-site, extract the URLs, and send them to the server context 130. In another embodiment, a web-server (e.g., information source 150-1) hosting the requested web-page, provides the context server 130 with the URL of the requested web-page. It should be noted that only URLs of selected web sites can be sent to the context server 130, for example, URLs related to web-sites that paid for the additional information.

In S730, the web-page respective of each received URL is downloaded to the context server. In S740, the web-page is then analyzed in order to identify the existence of at least one or more multimedia content elements in the uploaded web-page. It should be understood that a multimedia content element, such as an image or a video, may include a plurality of multimedia content elements. In S750, at least one signature generated for each identified multimedia content element is received by the server 130. The signatures for the multimedia content elements are generated by the SGS 140 as described in greater detail above.

In S760, respective of each signature, the context of the multimedia content element is determined. The determination of context based on the signatures is discussed in more detail hereinabove with respect of FIG. 5. In S770, respective of the context or the signature of the elements, one or more contextual filters to the one or more multimedia content elements are generated. The process of generating a contextual filter is discussed herein below with respect to FIG. 8.

The one or more contextual filters may be extracted from the data warehouse 160. The contextual filters enable editing of the context of the multimedia content as well as editing each of the one or more elements within the multimedia content. According to an embodiment, a contextual filter may include an initial context and a final context (e.g., "sadness" and "happiness," "day" and "night," "one" and "three," etc.), an editing action to be performed on concepts of multimedia content elements respective of the initial context and final context (e.g., "change from day to night," "change from sadness to happiness," "change from one to three," etc.), as well as one or more multimedia content elements that may be provided as part of performing the editing action. According to a further embodiment, the multimedia content elements of the contextual filter may be displayed as an overlay over the multimedia content. As an example, a contextual filter may enable changing of the expression of a person's face showing in an image. As another example, the background of an image may be changed as well as time of the day—from morning to night, etc.

As an exemplary and non-limiting example of contextual filter utilization, an image featuring a frowning child standing in front of a rainy background is received. Respective of this image, the server determines that the context of the image is "sadness," and then generates a contextual filter of "change from sadness to happiness." Images featuring a smile and a sunny background, concepts that are indexed with the context "happiness," are provided by the contextual filter and added to the image as overlays, thereby changing the image to one of a smiling child standing in front of a sunny background.

As another non-limiting example of an embodiment, an image featuring a fish on the sand of a beach is received. Respective of this image, the server determines that the context of the image is "fish out of water" and then generates the contextual filters of "change from one to three" and "change from dry land to ocean." Images featuring three fish and a water background, related to the concepts "three" for fish and "ocean" are provided by their respective contextual filters and added to the image as overlays, thereby changing the image to one of three fish in the ocean.

The one or more contextual filters can be sent directly to the web browser executed by user device 120-1 requesting the web-page. This requires establishing a data session between the context server 130 and the web browsers executed by user devices 120. In another embodiment, the one or more contextual filters are returned to a web server (e.g., information source 150) hosting the requested web-page. The web server returns the requested web-page with the multimedia element containing the contextual filters. In S780, it is checked whether the one or more multimedia content elements contained in the web-page has changed, and if so, execution continues with S740; otherwise, execution terminates.

As a non-limiting example, a web-page containing an image is uploaded to the server 130. Signatures are then generated by the SGS 140 respective of a person smiling and the background of the image, which is The Dam Square in Amsterdam. A contextual filter is generated and displayed as an overlay over the image. The contextual filter allows changing the user's expression from smiling to crying.

The web-page may contain a number of multimedia content elements; however, in some instances only a few contextual filters may be displayed in the web-page. Accordingly, in one embodiment, the signatures generated for the multimedia content elements are clustered and the cluster of signatures is matched to one or more advertisement items.

Figure 8:
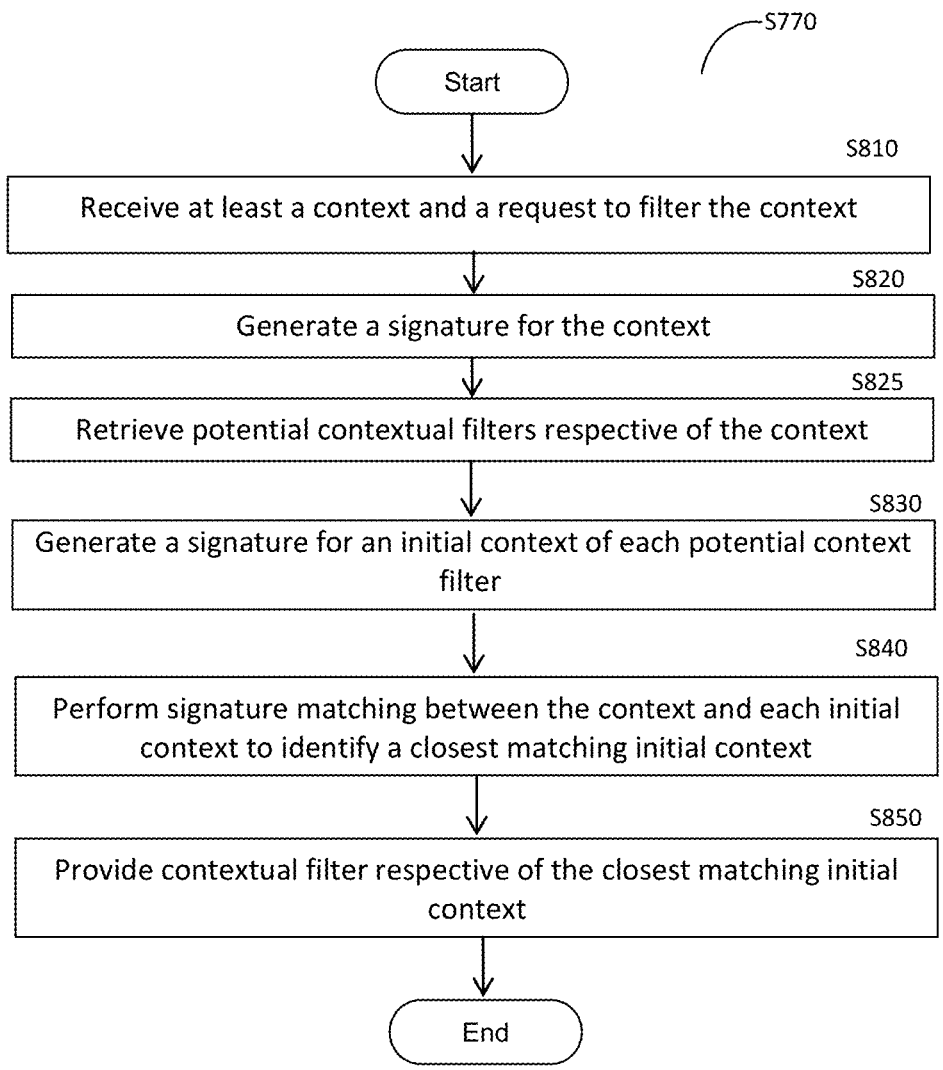
FIG. 8 is a flowchart demonstrating a method for generating contextual filters according to an embodiment.

FIG. 8 depicts an exemplary flowchart demonstrating the process S770 for generating contextual filters according to an embodiment. In S810, a context and a request to filter the context are received. In S820, at least one signature is generated for the context. Further discussion of the signature generation process is discussed hereinabove with respect to FIGS. 3 and 4. In an embodiment, this signature may be the signature of one of the multimedia content elements representing a concept associated with the context. In another embodiment, this signature may include a portion of the signature of a multimedia content element that demonstrates a high level of matching with a portion of another multimedia content element associated with the context.

In S825, potential contextual filters are retrieved from a data warehouse, for example, respective of the context signatures. Potential contextual filters may be, but are not limited to, contextual filters stored in the data warehouse. A potential contextual filter is associated with an initial context that includes multimedia content elements and/or signatures associated with the context of portions of multimedia content that the filter is designed to change. The potential contextual filter is also associated with a final context that includes multimedia content elements and/or signatures associated with the context of the desired overlays for the multimedia content. Additionally, the potential contextual filter contains multimedia content elements associated with the final context. Such multimedia content elements will be provided as overlays if the filter is selected for use. Potential contextual filters are selected to be applied if the signature of its initial context demonstrates a sufficient level of matching with the signatures of a multimedia content element's context.

As a non-limiting example, a potential contextual filter may contain an initial context including a signature associated with the concept "clouds." The potential contextual filter would also contain a final context including a signature associated with a second concept such as "sunshine." When the potential contextual filter is applied, multimedia content elements associated with the second concept (e.g., the sun, clear blue skies, and the like) are overlaid on portions of the original multimedia content featuring signatures representing the concept "clouds." As a result, a portion of an image containing a cloudy sky may be overlaid with images of the sun and clear blue skies.

In S830, a signature is generated for an initial context associated with each potential contextual filter. In an embodiment, this signature may be the signature of one of the multimedia content elements representing a concept associated with the context. In another embodiment, this signature may include a portion of the signature of a multimedia content element that demonstrates a high level of matching with a portion of another multimedia content element associated with the context.

In S840, a signature matching process is performed between the signature generated for the context in S820 and each signature of the initial context produced in S830. Two signatures are considered matching if they overlap other over a predefined threshold. A signature of an initial context that demonstrates the highest rate of matching among the analyzed initial contexts is then identified as a closest matching initial context. In S850, the potential contextual filter corresponding to the closest matching initial context is provided as the contextual filter for the input context. The contextual filter may be retrieved from a data warehouse (e.g., data warehouse 160).

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for providing contextual filters respective of an identified context of a plurality of multimedia content elements, comprising:
receiving the plurality of multimedia content elements;
generating at least one signature for each of the plurality of multimedia content elements; wherein the at least one signature of a multimedia content element of the plurality of multimedia content elements represents a response of one or more neural networks to the multimedia content element;
generating a plurality of concepts based on each of the plurality of multimedia content elements, wherein each concept of the plurality of concepts is an abstract description of the multimedia content element which the at least one respective signature was generated;
determining a context of each of the plurality of multimedia content elements based on the plurality of concepts generated based on the each of the plurality of concepts, wherein a context of a multimedia content element is determined as the correlation among the plurality of concepts generated based on the multimedia content element; and
providing at least one contextual filter with respect to the context of each of the plurality of multimedia content elements.

2. The method of claim 1, wherein the at least one contextual filter enables at least one of: editing of the context of the multimedia content element and editing of the content of each of the plurality of multimedia content elements.

3. The method of claim 1, wherein receiving the plurality of multimedia content elements further comprises: receiving a uniform resource locator (URL) of a web-page; downloading the web-page based on the received URL; and analyzing the web-page to identify the existence of each of the plurality of multimedia content elements.

4. The method of claim 1, further comprising: storing in a data warehouse the determined contexts and the at least one contextual filter.

5. The method of claim 3, wherein providing the at least one contextual filter with respect to the context of each of the plurality of multimedia content elements further comprises: generating a signature for the determined context; retrieving potential contextual filters from a data warehouse; generating a signature for an initial context of each of the retrieved potential contextual filters; performing signature matching between the signature of the context and the signature generated for each initial context to identify a closest matching initial context; and determining the contextual filter to the potential contextual filter respective of the closest matching initial context.

6. The method of claim 4, further comprising: identifying one or more portions of multimedia content in each of the plurality of multimedia content elements; generating at least one signature for each of the identified portions; analyzing the at least one signature using at least one previously generated signature maintained in the data warehouse; determining the context of the multimedia content element based on the signatures and the analysis; and generating at least one contextual filter with respect to the context of the multimedia content element and based on the signatures and the analysis.

7. The method of claim 1, wherein the at least one signature is robust to noise and distortion.

8. The method of claim 1, wherein each of the plurality of multimedia content elements is at least one of: an image, graphics, a video stream, a video clip, an audio stream, an audio clip, a video frame, a photograph, images of signals, and portions thereof.

9. The method of claim 1, wherein the correlation among the plurality of concepts is performed using a probabilistic model.

10. The method of claim 1, wherein the correlation among the plurality of concepts is based on sizes of signatures representing the concepts.

11. The method of claim 1, wherein the correlation among the plurality of concepts is based on spatial locations of each signature representing a concept.

12. The method according to claim 1 comprising generating the at least one signature for each of the plurality of multimedia content elements by a plurality of mutually independent computational cores that comprise the one or more neural networks.

13. The method according to claim 1 comprising:
receiving a request to edit a context of a multimedia content element, by applying a contextual filter related to the multimedia content element, and
modifying the multimedia content element by applying the a contextual filter related to the multimedia content element.

14. The method according to claim 13 wherein the modifying comprises changing a context of the multimedia content element from an initial content to a final context.

15. The method according to claim 13 wherein the modifying comprises overlaying a multimedia content element associated with the final context over a multimedia content element associated with the initial context.

16. A non-transitory computer readable medium having stored thereon instructions for causing one or more processing units to execute a process for providing contextual filters respective of an identified context of a plurality of multimedia content elements, the process comprising:
receiving the plurality of multimedia content elements;
generating at least one signature for each of the plurality of multimedia content elements; wherein the at least one signature of a multimedia content element of the plurality of multimedia content elements represents a response of one or more neural networks to the multimedia content element;
generating a plurality of concepts based on each of the plurality of multimedia content elements, wherein each concept of the plurality of concepts is an abstract description of the multimedia content element which the at least one respective signature was generated;
determining a context of each of the plurality of multimedia content elements based on the plurality of concepts generated based on the each of the plurality of concepts, wherein a context of a multimedia content element is determined as the correlation among the plurality of concepts generated based on the multimedia content element; and
providing at least one contextual filter with respect to the context of each of the plurality of multimedia content elements.

17. A system for providing contextual filters respective of an identified context of a plurality of multimedia content elements, comprising: a network interface for receiving a plurality of multimedia content elements; a processor; and a memory coupled to the processor, the memory contains instructions that when executed by the processor cause the system to:

generate at least one signature for each of the plurality of multimedia content elements; wherein the at least one signature of a multimedia content element of the plurality of multimedia content elements represents a response of one or more neural networks to the multimedia content element;

generate a plurality of concepts based on each of the plurality of multimedia content elements, wherein each concept of the plurality of concepts is an abstract description of the multimedia content element which the at least one respective signature was generated;

determine a context of each of the plurality of multimedia content elements based on the plurality of concepts generated based on the each of the plurality of concepts, wherein a context of a multimedia content element is determined as the correlation among the plurality of concepts generated based on the multimedia content element; and provide at least one contextual filter with respect to the context of each of the plurality of multimedia content elements.

18. The system of claim 17, wherein the at least one contextual filter enables at least one of: editing of the context of the multimedia content element and editing of the content of each of the plurality of multimedia content elements.

19. The system of claim 18, wherein the system is further configured to: generate a signature for the determined context; retrieve potential contextual filters from a data warehouse; generate a signature for an initial context of each of the retrieved potential contextual filters; perform signature matching between the signature of the context and the signature generated for each initial context to identify a closest matching initial context; and determine the contextual filter to the potential contextual filter respective of the closest matching initial context.

20. The system of claim 17, wherein the system is further configured to: receive a uniform resource locator (URL) of the web-page; download the web-page based on the received URL; and analyze the web-page to identify the existence of each of the plurality of multimedia content elements.

21. The system of claim 17, wherein the system is further configured to: store in a data warehouse the determined contexts and the at least one contextual filter.

22. The system of claim 17, wherein the system is further configured to: identify one or more portions of multimedia content in each of the plurality of multimedia content elements; generate at least one signature for each of the identified portions; analyze the at least one signature using at least one previously generated signature maintained in the data warehouse; determine the context of the multimedia content element based on the signatures and the analysis; and generate at least one contextual filter with respect to the context of the multimedia content element and based on the signatures and the analysis.

23. The system of claim 17, wherein the at least one signature is robust to noise and distortion.

24. The system of claim 17, wherein each of the plurality of multimedia content elements is at least one of: an image, graphics, a video stream, a video clip, an audio stream, an audio clip, a video frame, a photograph, images of signals, combinations thereof, and portions thereof.

* * * * *